(12) United States Patent
Jones

(10) Patent No.: US 6,561,589 B2
(45) Date of Patent: May 13, 2003

(54) DUAL ACTING TRUCK HOIST

(76) Inventor: Eldon D. Jones, 409 E. Watonwan St., Lake Crystal, MN (US) 56055

( * ) Notice: Subject to any disclaimer, the term of this patent is extended or adjusted under 35 U.S.C. 154(b) by 0 days.

(21) Appl. No.: 09/981,717

(22) Filed: Oct. 19, 2001

(65) Prior Publication Data

US 2002/0033633 A1 Mar. 21, 2002

Related U.S. Application Data

(63) Continuation-in-part of application No. 09/928,477, filed on Aug. 14, 2001, which is a continuation-in-part of application No. 09/543,363, filed on Apr. 5, 2000, now abandoned, which is a continuation-in-part of application No. 09/266,001, filed on Mar. 11, 1999, now Pat. No. 6,186,596.

(51) Int. Cl.$^7$ .................................................. B60P 1/16
(52) U.S. Cl. .................. 298/19 B; 298/22 R; 298/22 J; 298/22 B; 298/22 D
(58) Field of Search ............................. 298/19 R, 19 B, 298/22 R, 22 D, 22 J, 22 B

(56) References Cited

U.S. PATENT DOCUMENTS

| | | |
|---|---|---|
| 2,509,911 A | 5/1950 | Dore |
| 2,603,518 A | 7/1952 | Golay |
| 3,211,428 A | 10/1965 | Spracklin |
| 3,594,042 A | 7/1971 | Gauch ...................... 298/22 D |
| 4,029,358 A | 6/1977 | Bergdolt ................... 298/19 B |
| 4,052,105 A | 10/1977 | Moe .......................... 298/22 J |
| 4,176,881 A | 12/1979 | Cole .......................... 298/22 J |
| 4,762,370 A | 8/1988 | Corompt et al. .......... 298/19 R |
| 5,040,849 A | 8/1991 | Thomas et al. ........... 298/22 R |
| 5,048,896 A | 9/1991 | Channell ................... 298/22 J |
| 5,195,385 A * | 3/1993 | Johnson |
| 6,186,596 B1 * | 2/2001 | Jones .......................... 298/198 |

OTHER PUBLICATIONS

"Dump Body and Conversion Hoist Charts", Fourth Edition, National Truck Equipment Association.
Brochure, "TURBO™ Telescopic Hoist", Crysteel Manufacturing, Inc., 1999.
NTEA Hoist Classification Procedures, Published 12/92.
"5, 10, and 15 Yd Tipper™" Brochure, Crysteel Manufacturing, Inc.
NTEA Hoist Torque Graph Submittal Form, "Dump Body Hoist Torque" Completed by Crysteel Manufac. Inc.

* cited by examiner

*Primary Examiner*—Stephen T. Gordon
(74) *Attorney, Agent, or Firm*—Hall, Priddy, Myers & Vande Sande

(57) ABSTRACT

A dual acting underbody truck bed hoist is provided which exhibits increased lifting efficiency and safety. The hoist, in some embodiments, further includes an alignment of its various pivots and booster arm so as to maximize the height achieved during initial lifting to the breakaway point with the dump bed.

18 Claims, 19 Drawing Sheets

FIG. 4A

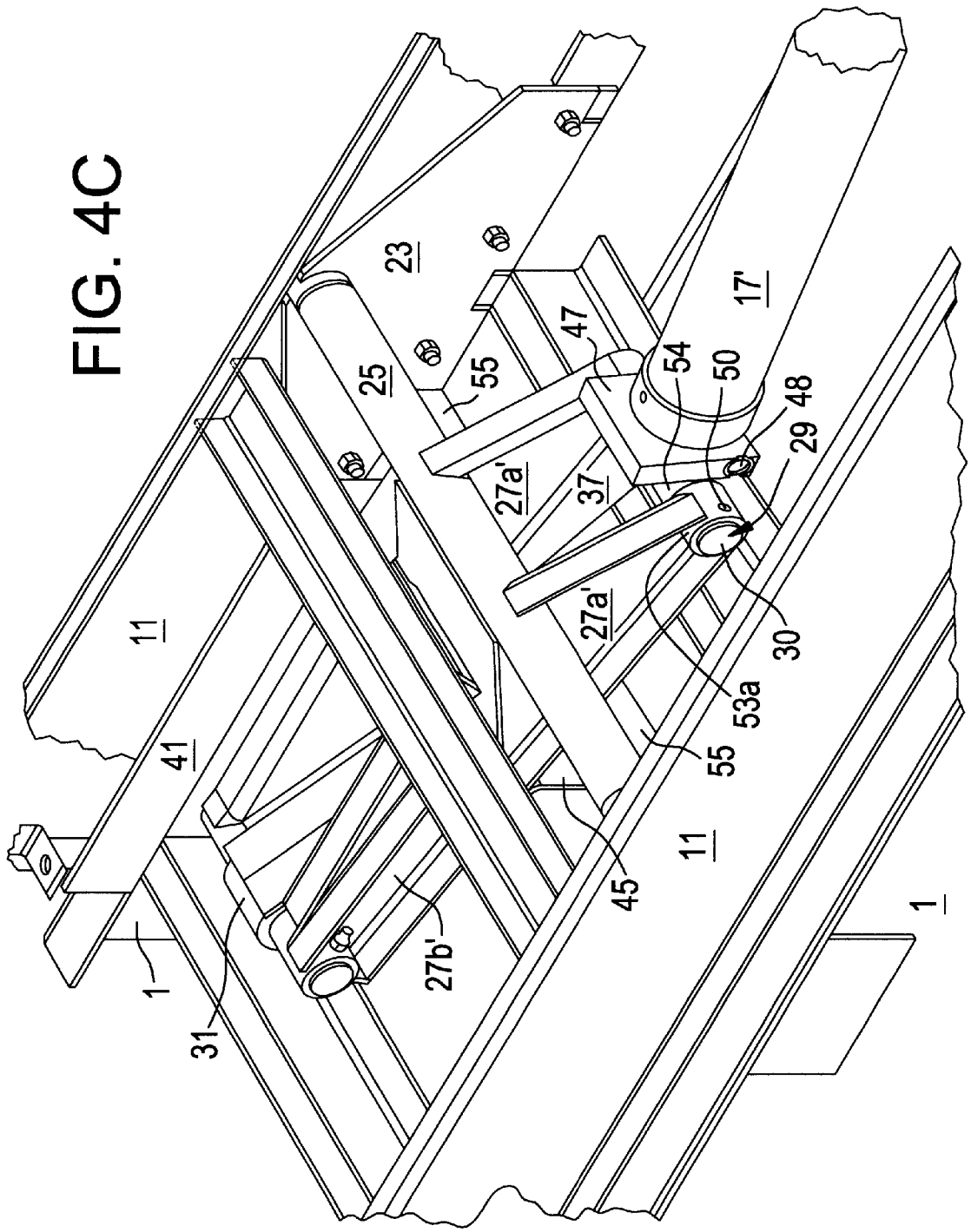

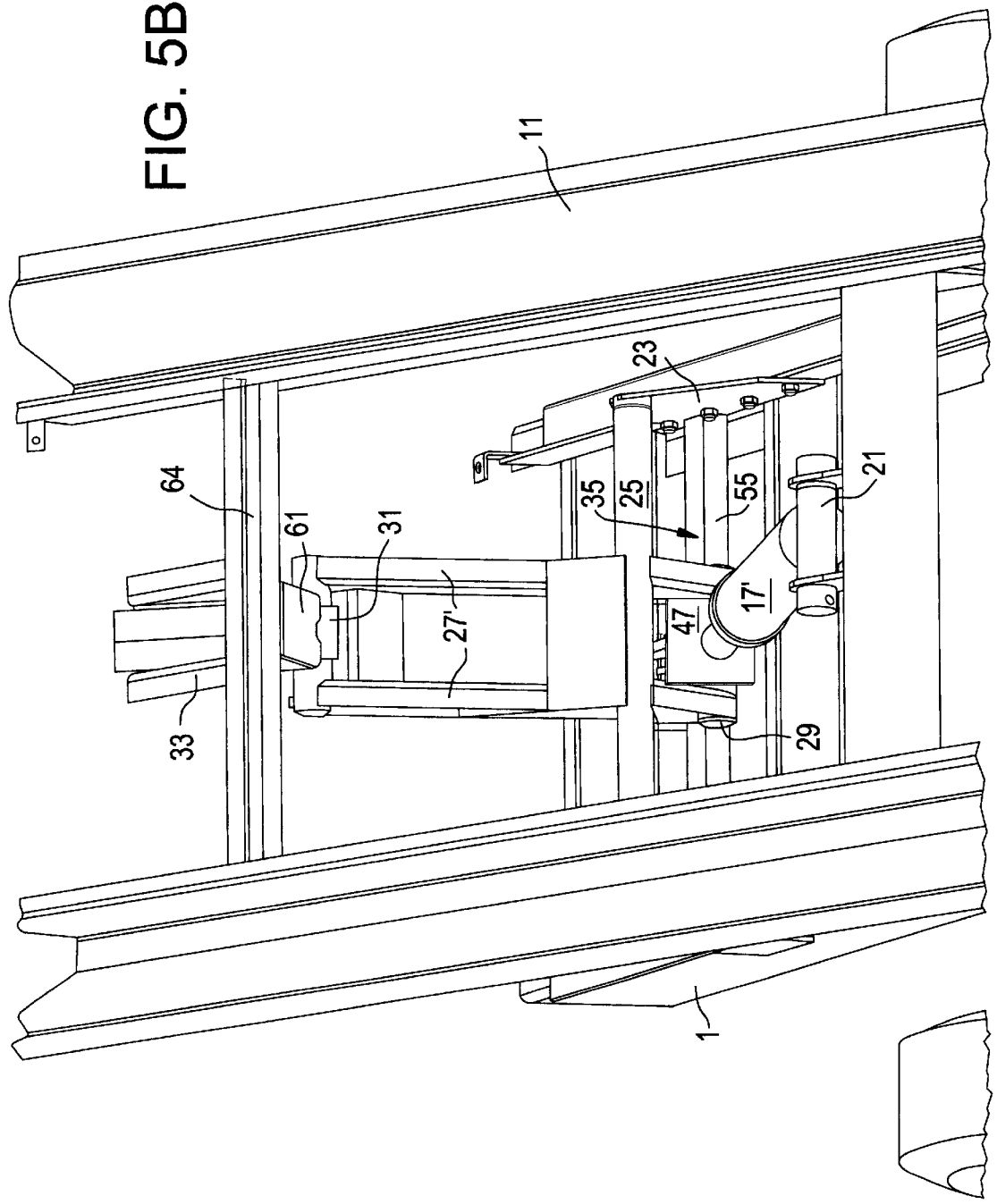

DUAL ACTING TRUCK HOIST

CROSS REFERENCE TO RELATED APPLICATIONS

This application is a continuation-in-part of my co-pending application Ser. No. 09/928,477, filed Aug. 14, 2001 entitled "DUAL TRUCK HOIST WITH SAFETY LATCH" which, in turn, is a continuation-in-part of my application Ser. No. 09/543,363, filed Apr. 5, 2000 entitled "DUAL ACTING TRUCK HOIST WITH SAFETY LATCH" now abandoned, which, in turn, is a continuation-in-part of my Ser. No. 09/266,001, filed Mar. 11, 1999 entitled "TRUCK HOIST", now U.S. Pat. No. 6,186,596, issued Feb. 13, 2001.

FIELD OF INVENTION

This invention relates to hoists for raising and lowering the dump beds of trucks. More particularly, this invention relates to dual acting truck hoists which exhibit increased lifting efficiency and safety.

BACKGROUND OF THE INVENTION

Extendible and retractable hoists placed between the frame of a vehicle and its dump bed (body) for raising and lowering the dump bed about a pivoting hinge are well known in the art and come in many different types and designs, whether they be rear or side dump vehicles. The term "truck" is used herein to describe all types of vehicles which employ such hoists, including light, medium and heavy duty dump trucks and trailers.

In a typical hydraulic truck hoist, one or more hydraulic cylinders lie lengthwise between the frame rails of the vehicle and underneath the truck bed. As a hoist's cylinder extends, one end of the hoist pushes against the underside of the dump bed while the other end of the hoist pushes against the frame of the truck to which it is pivotally attached. This causes the bed to rotate about its rear hinge pivot whereby the dump bed is raised. Retraction of the cylinder causes the bed to be lowered.

In many designs, the hoist cylinder is nearly parallel to the dump bed when in its lowered position, and thus has very little initial leverage at the beginning of the lifting process. During this initial lift period most of the force of the cylinder is directed towards the rear hinge rather than in the more efficient raising direction, which changes as the body is raised. Due to this inefficiency, larger cylinders are used than would otherwise be required. As is rather apparent, the size of the cylinder can not be changed during lifting and thus an oversized cylinder(s) to accommodate the initial inefficient lifting process must be used.

Many types of hydraulic hoists have been developed to address this initial lift problem. In one example, telescopic cylinders are mounted farther forward on the truck frame. This provides the cylinder with greater initial leverage. However, the cylinder in such devices usually must have a rather long stroke to achieve a sufficient dump angle (i.e. height of lift of the dump bed), which is a known disadvantage in the art.

Other attempts to improve these hoists have included the use of a simple lever arm to provide the lifting motion in an attempt to obtain a more efficient initial lift angle. Examples include those hoists disclosed in U.S. Pat. No. 4,052,105. Other designs include those disclosed in U.S. Pat. Nos. 2,509,911; 2,603,518; and 4,762,370. These patents disclose hoist designs in which a lever arm aids the cylinder during initial lift of the truck bed, and thereafter the cylinder completes the lifting process. Such systems are sometimes referred to as "dual acting" systems, and the lever arms may be referred to as "booster" arms. This invention adopts in its preferred embodiments this "dual acting" concept and, as described below, improves upon former designs in this regard.

Another problem faced in the dump truck art is the potential for operator abuse of the system if a portion of the load being carried in the dump bed (e.g. wet dirt) "hangs up" in the bed during the dumping operation and thus is not dumped as intended. In such situations, it is not unusual for the truck operator, with the bed fully raised, to put the transmission in gear, accelerate the engine and quickly "pop" the clutch, causing the truck to lurch, usually forward. As the truck lurches, the operator then quickly steps forcefully on the brake pedal. As the truck lurches, various parts of the hoist, as well as the dump bed, are pulled away from their established positions with respect to each other. Then, when the brakes are suddenly applied, the parts under force added to by the heavy dump bed, rebound back against those elements in the system which established the original position. The maneuver itself is designed to use the jarring effect of the rebound to dislodge the hungup portion of the load in the bed, and it is not unusual for the maneuver to be repeated several times to insure the intended result. Significant damage to various truck hoist parts, the hydraulic system, the truck, and the dump bed itself can result from this practice. A hoist which prevents or discourages this practice, or at least mitigates the potential for damage if the maneuver is conducted, is clearly needed in this art, and it is an object of this invention in certain preferred embodiments to provide such a hoist design.

In view of the above, it is apparent that there exists a need in the art for a hoist which overcomes, mitigates, or solves the above problems in the art. It is a purpose of this invention to fulfill this and other needs in the art which will become more apparent to the skilled artisan once given the following disclosure.

SUMMARY OF THE INVENTION

Generally speaking this invention fulfills the above needs in the art by providing:

a hoist for raising and lowering a truck bed to and from a truck frame, the hoist comprising:

a first extendible and retractable cylinder having a first end and a second end;

means for attaching the first end of the first cylinder to a truck frame;

a second extendible and retractable cylinder having a first end and a second end;

means for attaching the first end of the second cylinder to a truck frame, and means for attaching the second end of the second cylinder to a truck bed;

a lever mechanism comprising a base member attachable to a truck frame, an elongated arm having a first end and a second end, a first pivot connecting the second end of the first cylinder to the first end of the elongated arm, a second pivot connecting the base member to the elongated arm at a location intermediate the first and second ends of the elongated arm, means located proximal the second end of the elongated arm for contacting a member of the truck bed, a stop mechanism for limiting the extent of rotation of the elongated arm about the second pivot;

wherein extension of the first and second cylinders, when the hoist is installed on a truck, elevates the truck bed to a first elevated position; and wherein when the first cylinder extends to a predetermined length, extension of the second cylinder thereafter disengages the means proximal the second end of the elongated arm from the member of the truck bed, and elevates the truck bed to a second elevated position which is a greater elevation than the first elevated position.

In a preferred embodiment of this invention, the cylinders employed are telescopic cylinders comprised of a base cylinder and at least one tubular smaller cylinder or rod extending from the base cylinder, wherein the first end of the smaller rod is connected to the first pivot and its opposite second end is connected to the next largest cylinder or base cylinder such that the base cylinder is connected to the truck bed. It is understood, of course, that while both a single stage cylinder and multi-stage, telescopic cylinder are illustrated, either cylinder type, where appropriate, is contemplated for use therein.

In further preferred embodiments, the connection of the tubular cylinder to the first pivot comprises the conventional crosshead member of a hydraulic cylinder.

In a still further preferred embodiment of this invention, the first pivot is offset from the second pivot in a manner described below thereby to achieve certain unique results.

This invention will now be described with respect to certain embodiments thereof as illustrated in the following drawings, wherein:

BRIEF DESCRIPTION OF THE DRAWINGS

FIG. 4A is a side plan, partially sectionalized, view of another embodiment of a hoist according to this invention employing a single stage cylinder and mounted on a truck with the truck bed fully down and unlatched.

FIG. 4C is a forward looking partial perspective view of the hoist in the down mode shown in FIG. 4B.

FIG. 5B is a forward looking, partial perspective view of the hoist in its mode as illustrated in FIG. 5A.

DETAILED DESCRIPTION OF CERTAIN EMBODIMENTS

Figure 1:
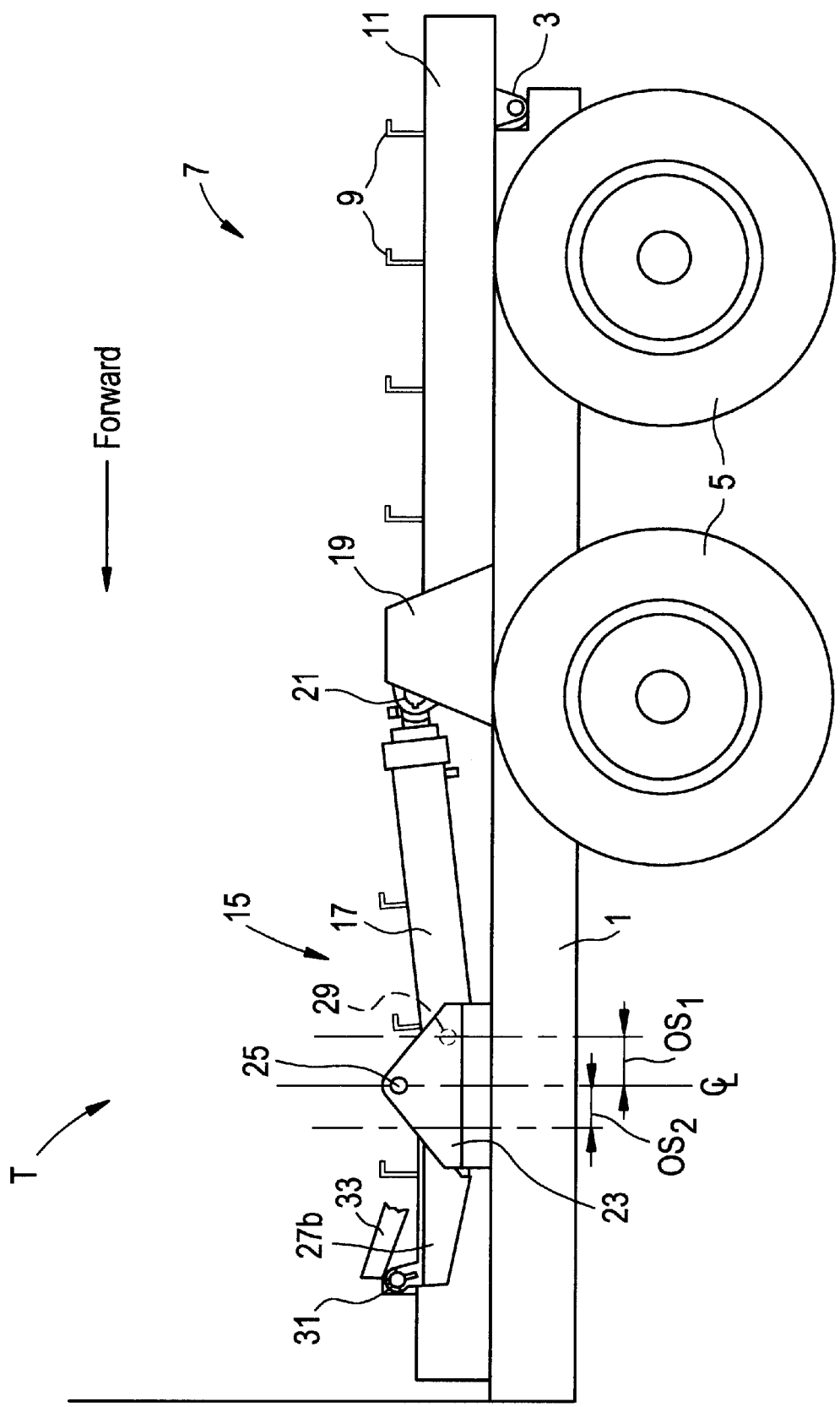
FIG. 1 is a partial side view of a truck having a raisable and lowerable dump bed, and provided with a hoist mechanism employing a two stage telescopic cylinder according to the subject invention.
Figure 2:
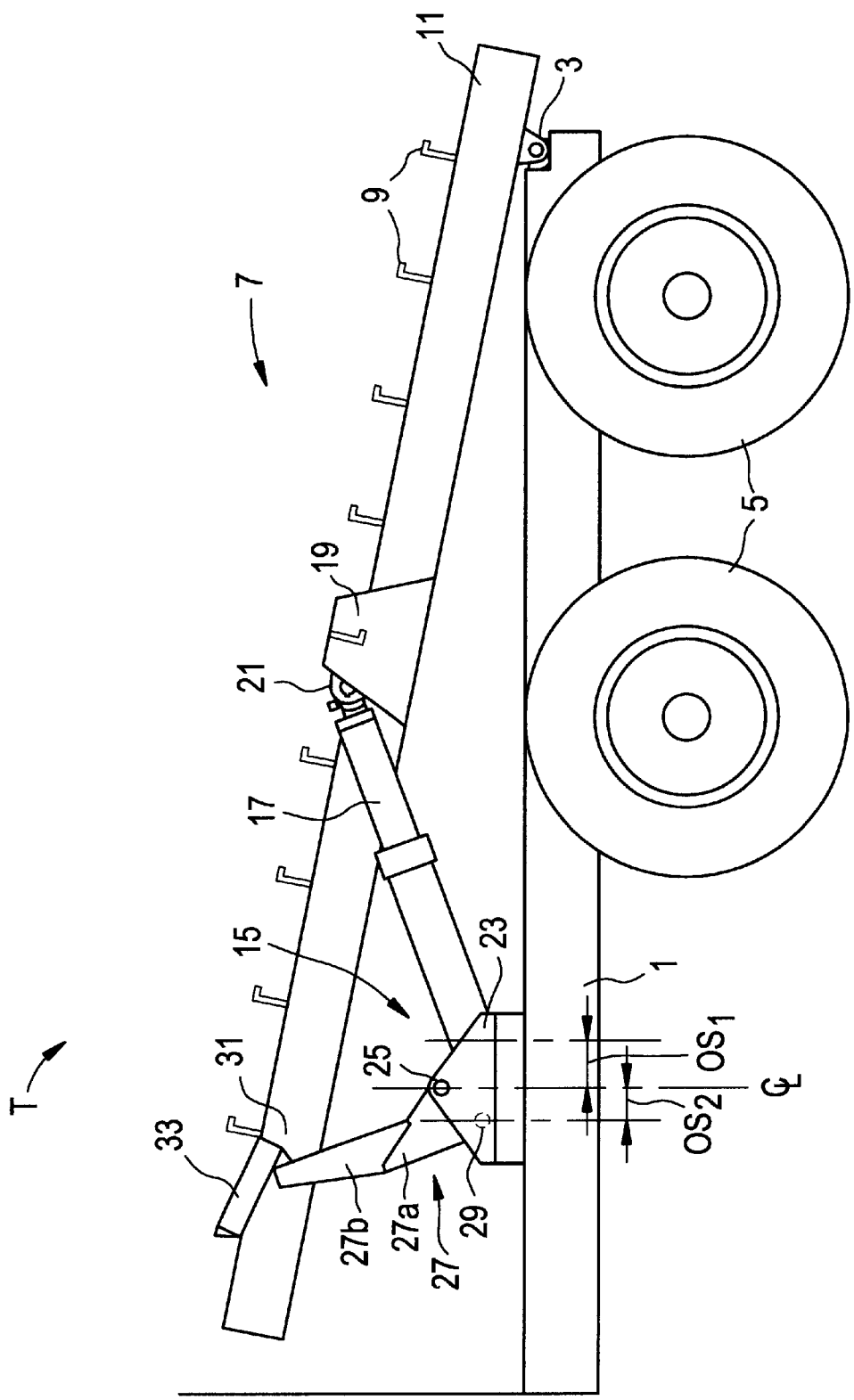
FIG. 2 is a side plan view of the embodiment of FIG. 1 illustrating the hoist near the end of the first lift phase.
Figure 3:
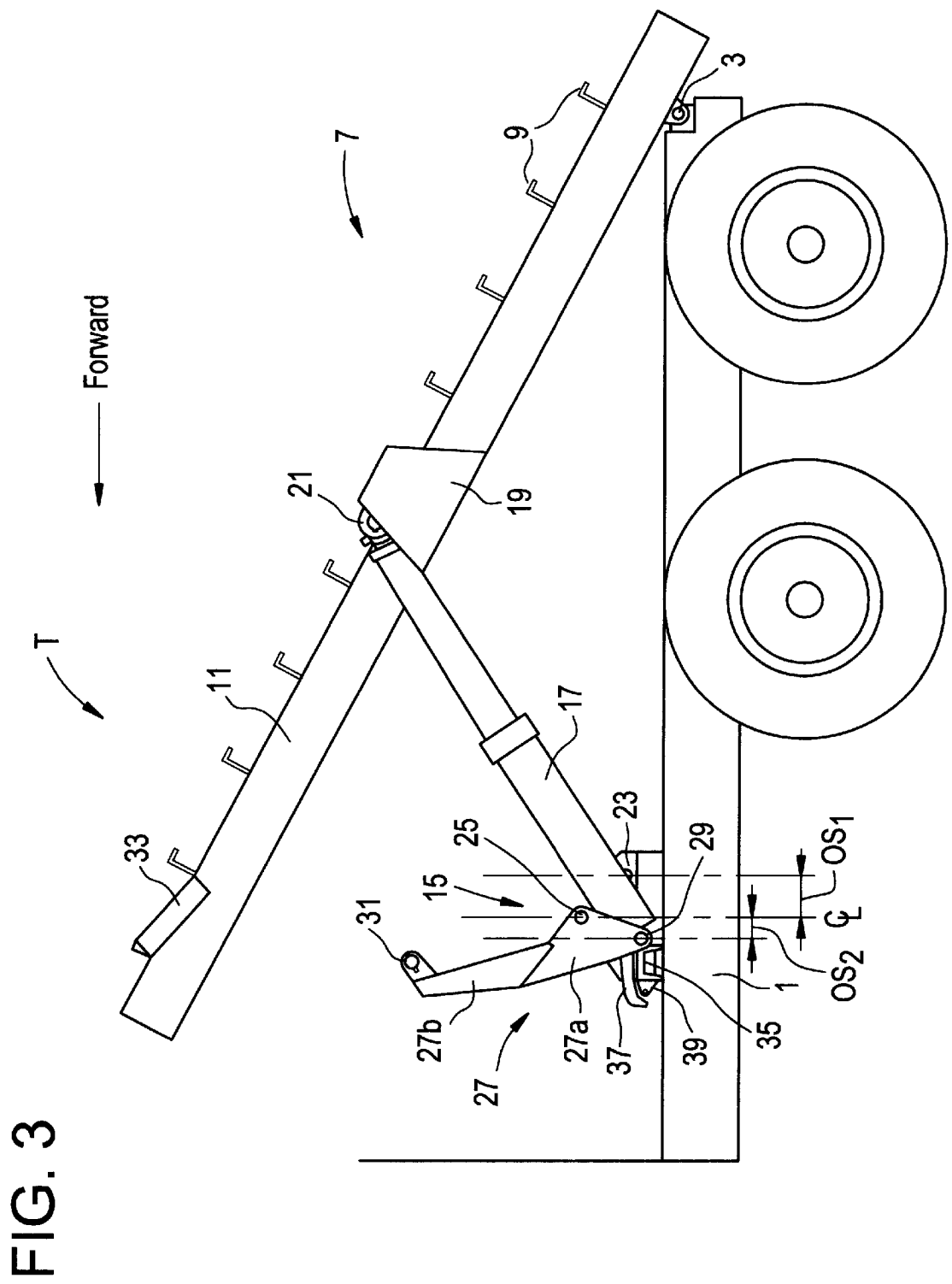
FIG. 3 is a partial side view of the embodiment of FIG. 1 showing the hoist during the second lift phase.

With initial reference to FIGS. 1–3, there is illustrated a partial, quasi-schematic view of a typical truck (e.g. straight dump truck or dump trailer) T having an elongated frame member 1, a rear pivot hinge 3 and wheels 5. It is understood of course that the other side of the vehicle is duplicated as a mirror image of this view (various perspective views demonstrating this being discussed hereinafter).

In this respect, the term "truck" is used herein generically as aforesaid to mean any vehicle which employs a dump bed of some type and thus which could employ a hoist according to this invention to dump load (cargo) from the dump bed (either fore-to-aft or side-to-side).

Located on frame member(s) 1 is dump bed 7 shown by way of its cross members 9 and its longitudinal frame members 11 (located on each side of bed 7). The type and shape of the bed itself is not critical to this invention which accommodates many such types and designs.

FIG. 1 illustrates in this respect then, a generic bed 7 in its down position, such that, in conventional fashion, bed frame members 11 rest upon their respective truck frame members 1 on either side of the truck T. As illustrated in sequential drawings FIGS. 2–3 following after FIG. 1, bed 7 is raised for dumping by an embodiment of the hoist mechanism of this invention, generally shown at 15. This is accomplished by extending in this instance, a single hydraulic cylinder 17 (and for lowering bed 7, retracting cylinder 17) using a conventional hydraulic pump and valve system whose controls are normally located in the cab of the truck accessible to the driver. The raising and lowering operation through the flow of hydraulic fluid which thereby pivots bed 7 about rear hinge 3 connected in conventional fashion at and between the rear ends of frame members 1 and 11, is well understood in the art and any such construction is useful herein.

In this respect, it is understood, of course, that the type of hoist system employed may be either a so-called "power-up/power-down" or a "power-up/gravity down" system. Both types are contemplated for use in this invention, each having their known advantages. For most purposes, however, the conventional "power-up/power-down" hoist is preferred for use herein. The valving for either of these two types of hoists is conventional and well known to the skilled artisan in this art and the drawings herein assume that either type of hoist mechanism (system) may be employed.

To accomplish this lifting and lowering task, one end of conventional two stage, hydraulically operated telescopic cylinder 17 is connected to bed mounting bracket 19 by a conventional pivot 21 which allows the end of cylinder 17 to rotate with respect thereto as it is raised and lowered (i.e. extended and retracted). Cylinder 17 is connected at its first end, or truck frame end, to a lever arm mechanism described below. In the embodiment illustrated in FIGS. 1–3 telescopic two stage cylinder 17 is employed and has its largest base member attached to the lever arm mechanism and its smallest rod, or cylinder which telescopes, attached to bracket 19. Dual, parallel cylinders are also contemplated within the scope of this invention. In addition, and in certain other embodiments illustrated in FIGS. 4–8 and discussed below, the orientation of cylinder 17 (now referenced as 17') is reversed, and the cylinder is a single stage cylinder resulting in space saving considerations which in certain truck bed designs is necessary and/or desirable.

In this regard, hoist assembly 15 includes a pair of base members 23, each attached to respective frame rails 1 (only one shown in FIG. 3). Base members 23 hold the two ends of elongated second cylindrical pivot 25 thereby rotatably connecting a pair of elongated arms 27 to the truck frame. Arms 27 have a first end connected to first pivot 29 for rotation thereabout when cylinder 17 is extended or retracted. First pivot 29 also serves as a pivot for the first end of cylinder 17 to rotate thereabout when cylinder 17 is extended or retracted. Second pivot 25 is rotatably connected to arms 27 at a point located intermediate the first end of arms 27 located at first pivot 29 and the opposite second end of arms 27. The second end of arms 27 terminates in roller or slide mechanism 31 which initially contacts either rail 11 or, optionally, track 33 attached to rail 11. Arms 27 may be arcuately shaped in two sections, a relatively large triangular section 27a and an arcuately angled arm portion 27b, if desired. Extending between base members 23, forward of first pivot 29, and in pivot 29's path of rotation is stop mechanism 35 (described below).

Figure 4A:
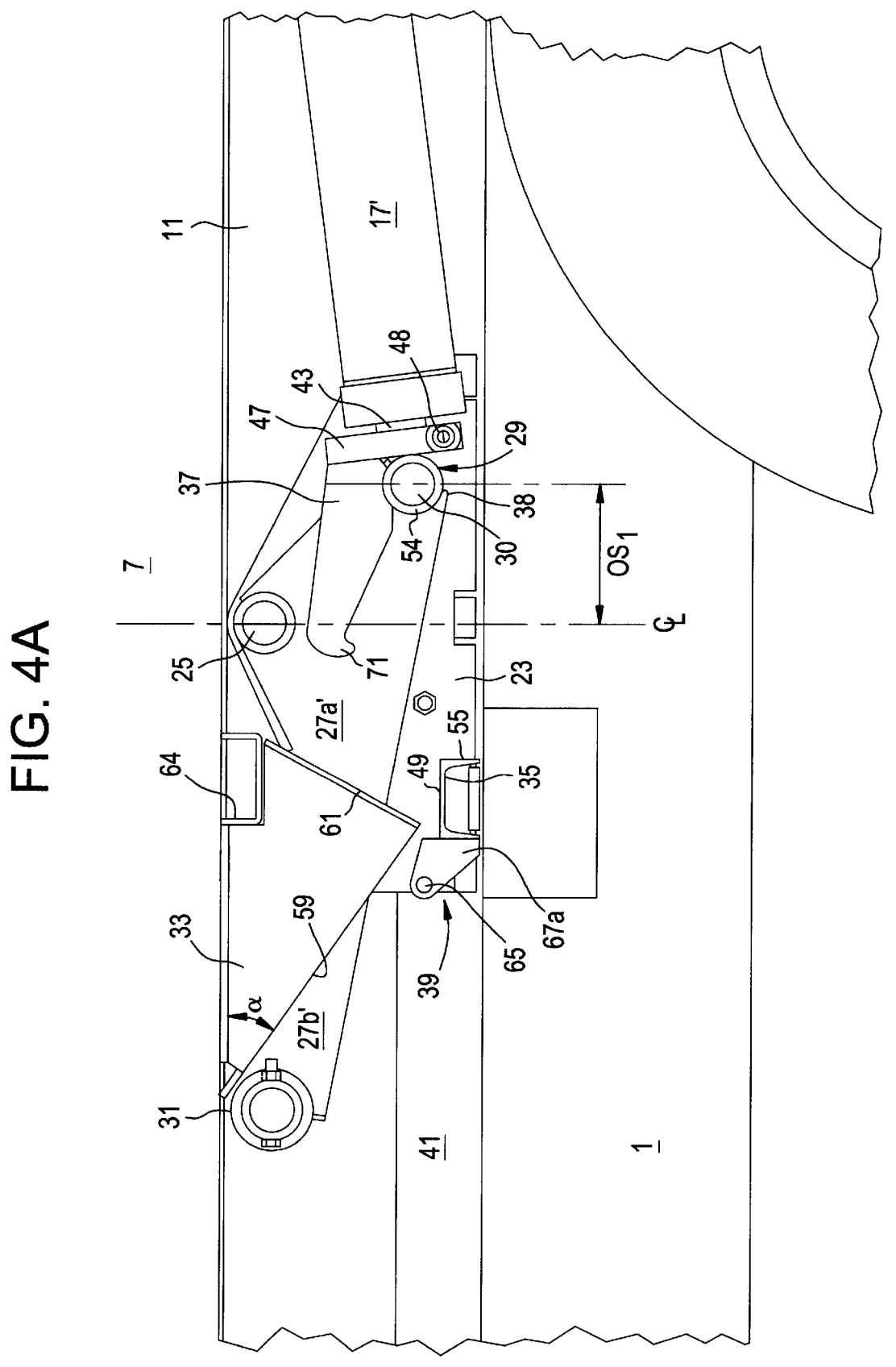

Further comprising hoist 15 is retaining hook (latching member) 37 and latch retaining member 39. As shown in FIG. 4A, for example, retaining hook 37 is rigidly attached as by welding to plate member 47 (which may also be the housing for the hydraulic porting 48) which in turn is then directly attached to tubular shaft 43 of cylinder 17' (FIG. 4A) while latch retaining member 39 is conveniently connected to the forward edge of stop mechanism 35. Stop mechanism 35, in this respect, may be simply formed of two opposing L-shaped angle beams to form a box-like structure or channel beam. By the use of the term "forward" to specify a position, such as the position of stop mechanism 35 with respect to pivot 29, for example, is meant in the direction as indicated by the forward direction of travel of the vehicle. (See the arrow in FIG. 3 marked "forward".) "Rearward" is in the opposite direction.

Figure 4B:
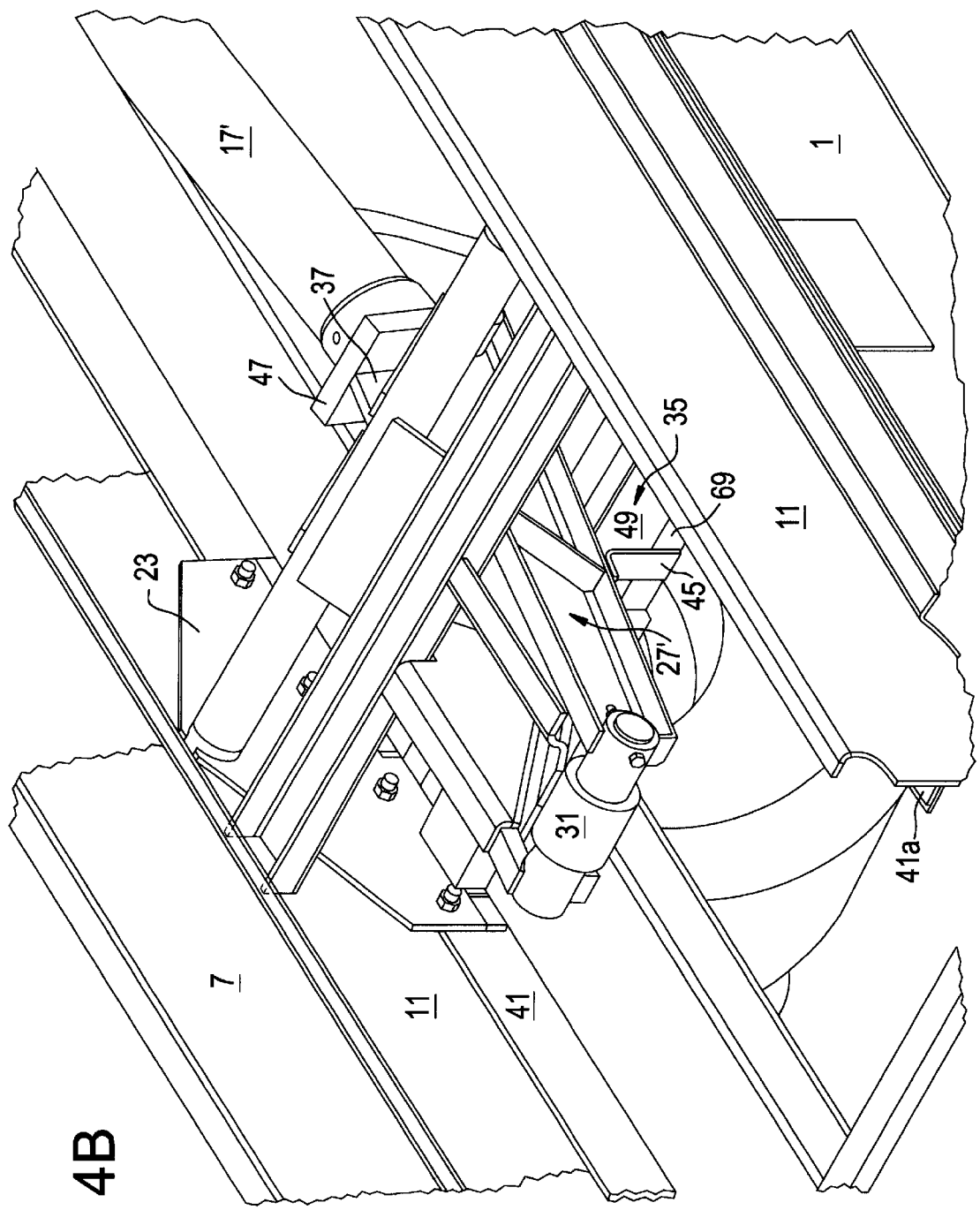
FIG. 4B is a rearward looking partial perspective view of the hoist in the down mode shown in FIG. 4A.

One of the features of the illustrated embodiments of the hoists of this invention is that they are "dual acting", thus overcoming the first above-described problem in the art. The parallel pair of elongated arms 27 serves this purpose by positioning first pivot 29 in a predetermined manner relative to second pivot 25. To aid in the initial lifting, thus to provide the dual lifting action, the two second, dump bed contacting, ends of arms 27, commonly joined by roller 31 (see FIG. 4B), are presented initially in lifting contact with dump bed 7 usually near or proximal the front end of the bed as shown in FIG. 4A. For this purpose, bed frame members 11 may be optionally provided with an angled track 33 on which roller (or optional slide plate) 31 rests (see FIGS. 1 and 4A). Not only does track 33 provide a smooth surface but, properly designed, it also builds in an efficient lifting angle for arms 27, as well as to add lifting height to bed 7 over that which is achieved by arms 27 themselves.

The actual location of the hoists of this invention with respect to their distance along the truck's frame from the rear hinge, the length of each elongated booster arm (e.g. each arm 27), the distance of the cylinder's connection on the dump bed with respect to the rear hinge, etc., will vary from truck to truck and are, given this disclosure (and the example given below), a matter of design choice within the skill of the artisan. This task, for example, is rather simplified by reference to known power (torque) curves provided by The National Truck Equipment Association (NTEA) of Farmington Hills, Mich. Generally speaking, it is recognized for safety, and as an industry standard, that the maximum lift angle of a dump bed (formed between the truck's frame rail and frame of the dump bed, at the hinge) should be no less than 50 degrees. Given the length of the bed, truck frame and NTEA power curves, routine analysis for a particular truck configuration will dictate the most efficient location of the parts and size cylinder needed.

In certain embodiments of this invention the hoist is located so that: (a) arm (or arms, as illustrated) 27 assumes about two-thirds of the torque at lift off from the truck frame until breakaway from the bed, the remaining one third being assumed by hoist cylinder 17 at pivot 21, (b) the minimum designed total dump angle allowed is 50 degrees, and (c) the breakaway angle at the hinge is about 13–17° and preferably about 15° (i.e. the angle of lift at which mechanism 31 breaks away from the bed, or guide track if provided). It is understood, of course, that these angles are preferred for the type hoist illustrated. Other types or sizes may employ different angles to maximize their effectiveness while still employing this invention.

When so designed, in accordance with this invention, it has been found for most conventional dump beds that the cylinder can be small enough such that up to one third less fluid is needed in the system. This can be an important difference in not just amount, but in the space saving size of the container (e.g. high density polyethylene reservoir tank) needed as a reservoir to hold the fluid when the cylinder is in its "down", i.e. fully retracted position. The smaller cylinder also results in a smaller cycle time, e.g. as much as one third faster.

EXAMPLE

By way of guideline rather than limitation and with reference to FIG. 1, a typical dump truck T may have a ten foot dump bed (fore to aft) such as a Crysteel Manufacturing Co. FIVE YARD TIPPER®, and a two stage telescopic hydraulically operated cylinder employing a 10 gallon reservoir, at 6 gal./min. and 2500 psi, a Commercial Intertec hydraulic pump, Model P-20, and a rear body overhang of six inches rearward of hinge 3. In this example, such a configuration, according to an embodiment of this invention, may be constructed so as to have the following dimensions and location on the truck:

Centerline CL of pivot 25 is located 90.50 inches from the centerline of hinge pivot 3. $OS_1$ is 6.04 inches at rest (down mode). $OS_2$ at rest is 3.30 inches. The distance from CL of pivot 25 to the vertical centerline of roller 31 at rest is 21.50 inches, and is 39.88 inches to the vertical centerline of pivot assembly 21. The radius distance between pivot 29 and 25 (center to center) is 8.13 inches.

Figure 5A:
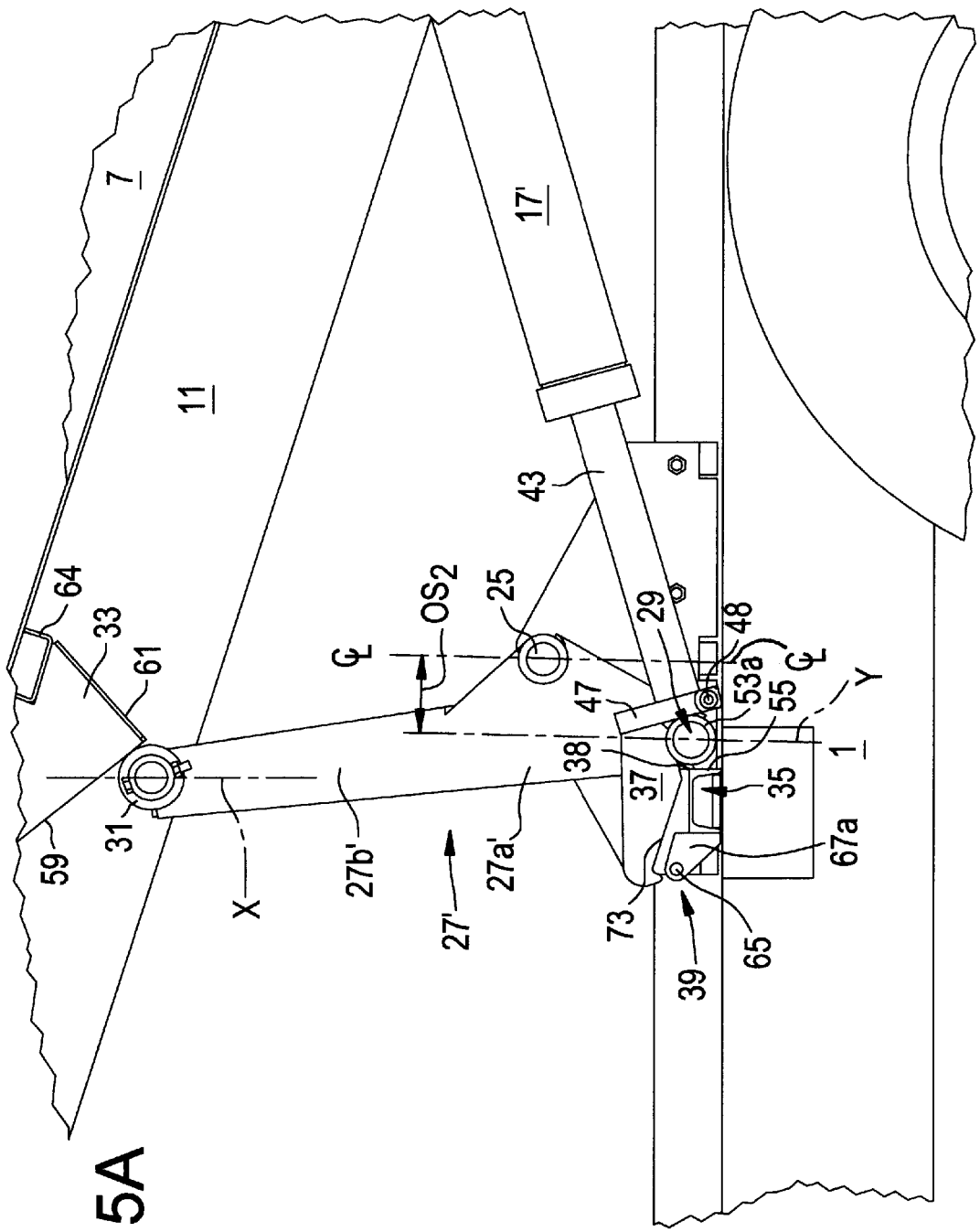
FIG. 5A is a partial side plan, quasi-schematic view of the embodiment of FIGS. 4A–C, unlatched but in a partially raised mode.

In this same configuration, and with reference to FIG. 4A, as well as FIG. 1, track 33 is then provided with a surface 59 which is 14.00 inches. Angle is 33.7° (i.e. about 34°). Track 33 is located as shown in FIG. 4A so that at rest, roller 31 is, as illustrated, at the uppermost end of surface 59, and at the breakaway angle of about 15° will be at or near the other end of surface 59 as illustrated in FIG. 5A.

Returning now to the drawings, the actual operation of hoist 15 is schematically illustrated in operationally sequential FIGS. 1–3, and for another hosit embodiment of this invention in FIGS. 4–7 (all figures in this sequence). For orientation purposes the relative location of first pivot 29 and second pivot 25 and their relationship to the lifting operation is best described with reference to FIGS. 1–3, although it is generally the same for the embodiment of FIGS. 4–7. Since rotation of cylinder 17 and arms 27 take place about central second pivot 25, the vertical plane of pivot 25 is designated as centerline "CL". As can be seen in FIG. 1, the vertical plane of first pivot 29 is to the rear of CL when dump bed 7 is in its "down" mode wherein frame 11 rests on truck frame 1 and cylinder 17 is fully retracted. This rearward offset of the vertical plane of first pivot 29 is designated as $OS_1$. As bed 7 is raised, first pivot 29 continues to rotate clockwise about second pivot 25, and passes vertical centerplane CL by a significant offset distance whose vertical plane is designated as "$OS_2$" before the first end of elongated arm 27 contacts stop mechanism 35 to prohibit further clockwise rotation of first pivot 29. Further extension of two stage cylinder 17 will, of course, continue to raise dump bed 7 (about hinge 3), but without the aid of elongated booster arms 27, because roller (or slide) 31 now separates from track 33 due to the fact that arms 27 are prohibited by stop mechanism 35 from further rotating.

In this way, the hoist system as illustrated achieves the known advantage of dual action, wherein arms 27 have aided cylinder 17 during initial lifting, and where at a selected advantageous "breakaway" point in the lifting operation, cylinder 17 may now efficiently do the remainder of the lifting by itself without help from booster arms 27. However, at this point, due to the achievement of offset $OS_2$ of first pivot 29 from second pivot 25 as described above, a significant advantage is achieved. Because first pivot 29 has been allowed to rotate past "CL" to a finite offset distance $OS_2$, such extra rotation which thereby results in further upward movement of arcuately shaped (upwardly angled) arm 27 before its rotation is stopped by stop mechanism 35, achieves a superior initial lift height of bed 7 before cylinder 17 takes over on its own. This achievement of height can be further enhanced by a properly designed track member 33.

While some prior dual acting hoists may have inadvertently achieved some form of offset, the purpose of the offsets $OS_1$ and $OS_2$ are specifically chosen here, in the preferred embodiments of this invention, so as to coordinate with the breakaway angle 13–17° of the dump bed thereby to maximize the effect of booster arms 27 (or 27'). To do this, as can be seen in the referenced FIGS. 2 and 5A, $OS_2$ at breakaway may range from slightly greater than zero to a small finite number such that slide or roller end 31 has reached its maximum effective height just before breakaway. Because the shape of longitudinal arms 27, 27' may take many forms, the offset $OS_2$ is, of course, normally correlated to achieve the maximum vertical height of the second end (at 31) of arms 27 (27') whatever the arms' and/or ends' configuration might be.

In certain preferred embodiments of this invention, as illustrated in FIG. 5A, the vertical centerline "X" of the tip end (here 31) of arms 27 should not normally be allowed to rotate past (i.e. to the right, or rear of, in FIG. 5A) the vertical centerline "Y" of first pivot 29. The reason for this is to afford a protection against over-stressing of the parts during lifting. In FIG. 5A it can be seen that as long as end 31 is in contact with surface 59 it is bearing a portion of the weight of bed 7. The force of this weight is then vectored toward pivot 29. So long as end 31 remains forward of pivot 29, this force (weight) is being effectively taken up by the hydraulic fluid under pressure in the cylinder and stress on pivot 29, etc. is thereby minimized. If, however, end 31 extends sufficiently beyond (to the right or rear of) pivot 29, the protection afforded by the hydraulic system is no longer available and the weight of the bed is taken up by pivot 29 now under stress, a situation avoided by the embodiment shown in FIG. 5A.

To better describe the features and operation of certain preferred embodiments of this invention, attention is now directed to FIGS. 4A–7B which are set forth in sequential, lifting mode fashion for illustrative purposes. FIGS. 4A–7B further illustrate an embodiment of the unique, improved latching mechanisms and its sequential latching technique as contemplated by this invention. In this respect, attention is first directed to FIGS. 4A–C wherein dump bed 7 is shown in its "down" position ready to be raised. In this embodiment, dump bed frame members 11 on either side of the truck rest on L-shaped guide plates 41 connected in conventional fashion to the truck's longitudinal frame members 1. Various cross members well known in the industry, as well as dual wheels and an axle, are illustrated, but being conventional, are unnumbered for clarity. In addition, and differing from FIGS. 1–3, cylinder 17', here a single stage hydraulically operated cylinder, has been reversed, such that its second end is now the larger cylinder which is located at bed pivot 21 and its final rod or tubular cylinder shaft 43 (see FIG. 5A) is now connected to first pivot 29. Still further, in this embodiment, while elongated arms 27' are still formed of a triangular portion 27a' and an elongated upper arm portion 27b', portion 27b' and 27a' are not as arcuately angled as their counterparts are in the embodiment of FIGS. 1–3. However, like FIGS. 1–3 the offsets $OS_1$ and $OS_2$ with respect to CL and stop mechanism 35 are still maintained as demonstrated by a comparison of FIG. 4A with FIG. 7A).

Attention is now directed to the latching mechanism as illustrated in sequential fashion in these drawings. In FIGS. 4A–C, cylinder 17' is in its most retracted position such that the dump bed's frame rails 11 rest on the horizontal flanges 41a of guide plates (members) 41 located on the top surface of truck T's longitudinal frame members 1 on either side of the vehicle. In this down position or mode, twin parallel elongated arms 27' rest on a pair of support members 45 (FIG. 4B) located under each arm 27' and connected to the forward wall of stop mechanism 35. Cylinder 17' is provided at its first end with plate member 47 to which is rigidly connected (as by welding) the butt end of latching hook member 37. Hook 37 then extends forward longitudinally from plate 47 between arms 27' at an initial position so as to be elevated above upper surface 49 of stop mechanism 35 when cylinder 17' is extended or retracted.

Figure 6A:
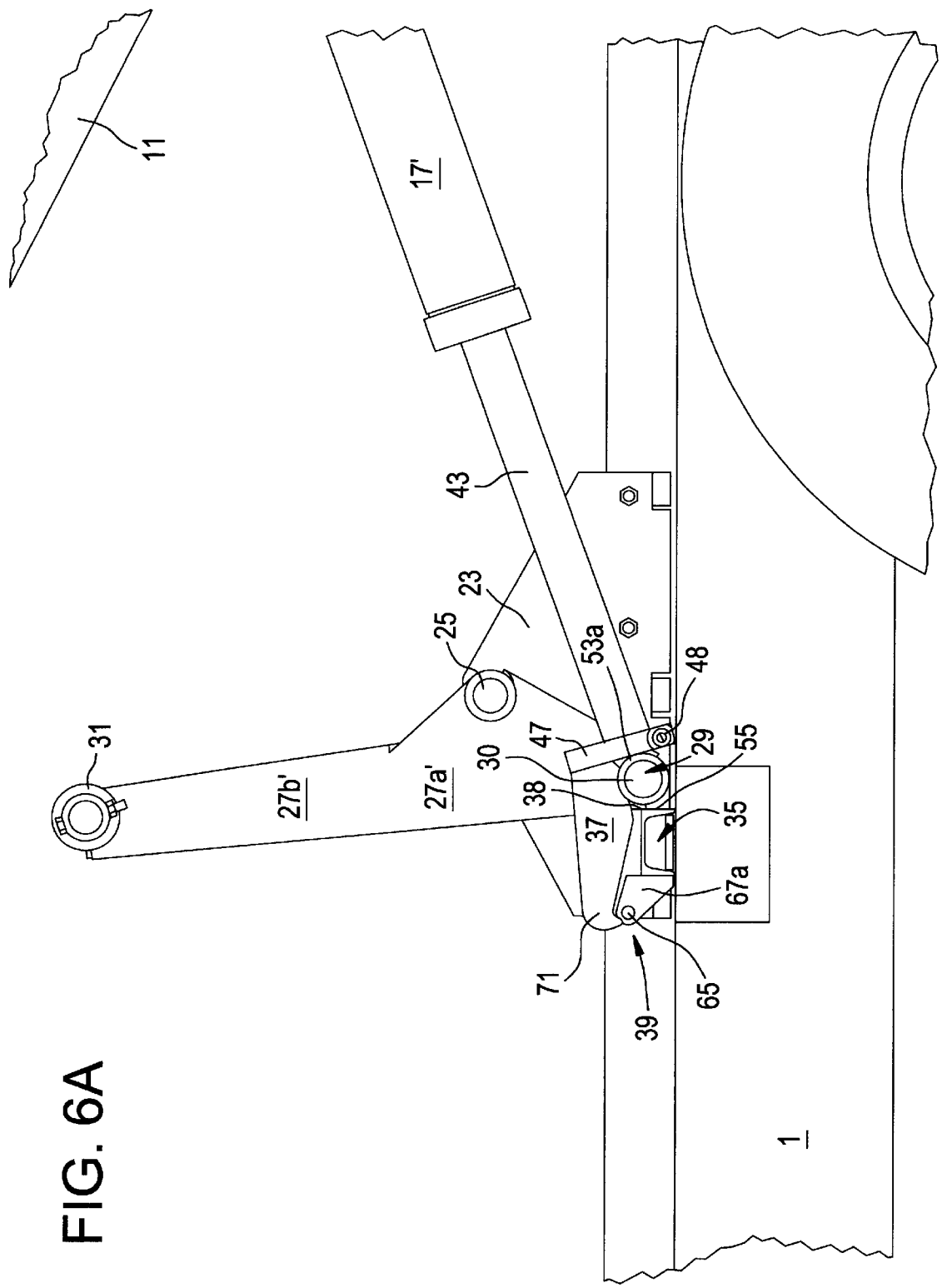
FIG. 6A is a side plan, quasi-schematic partial view of the embodiment of FIGS. 4A–C, just prior to latching and in a more advanced raised mode than in FIGS. 5A–C.
Figure 6B:
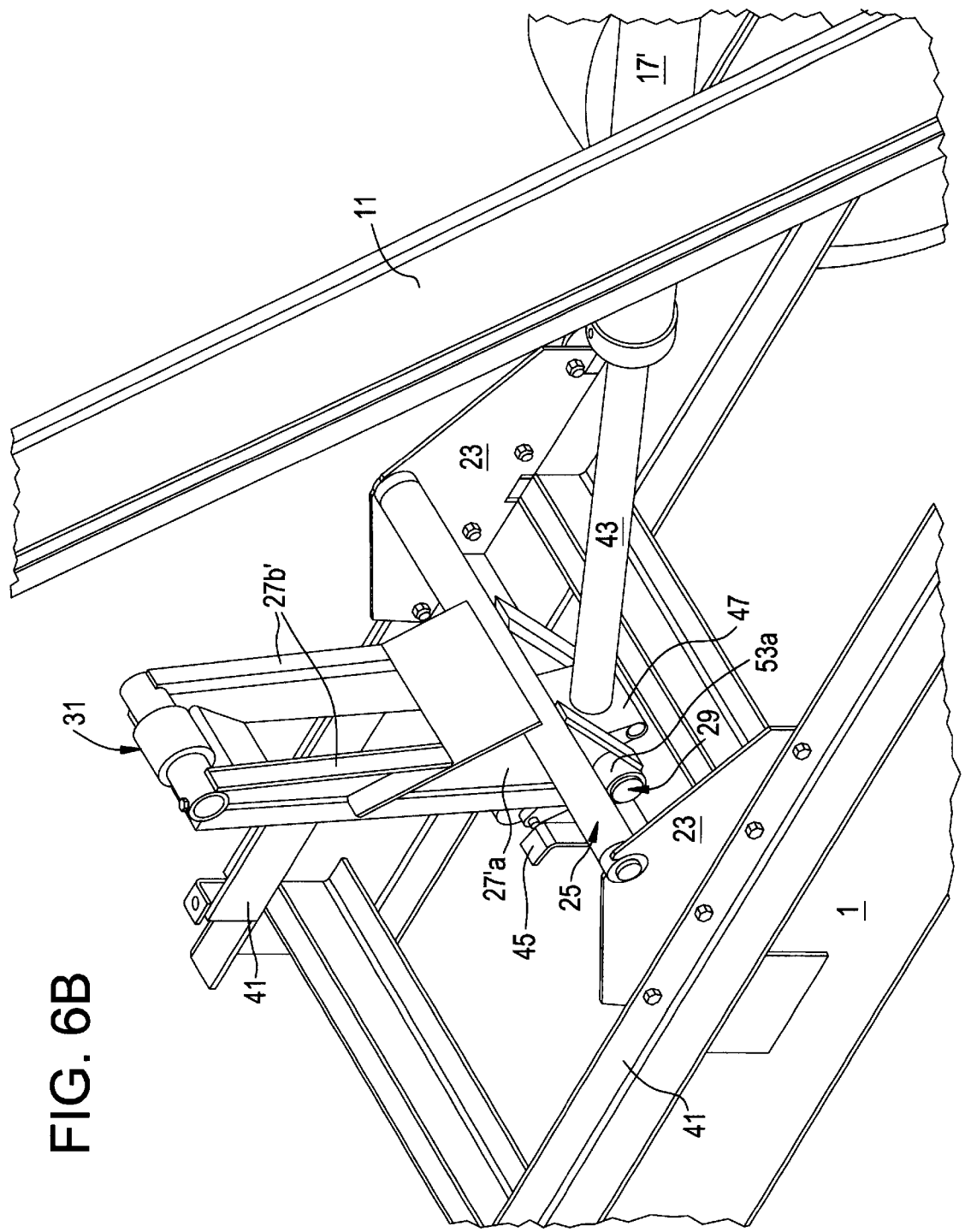
FIG. 6B is a forward looking partial perspective view of the hoist and the mode as illustrated in FIG. 6A.
Figure 7A:
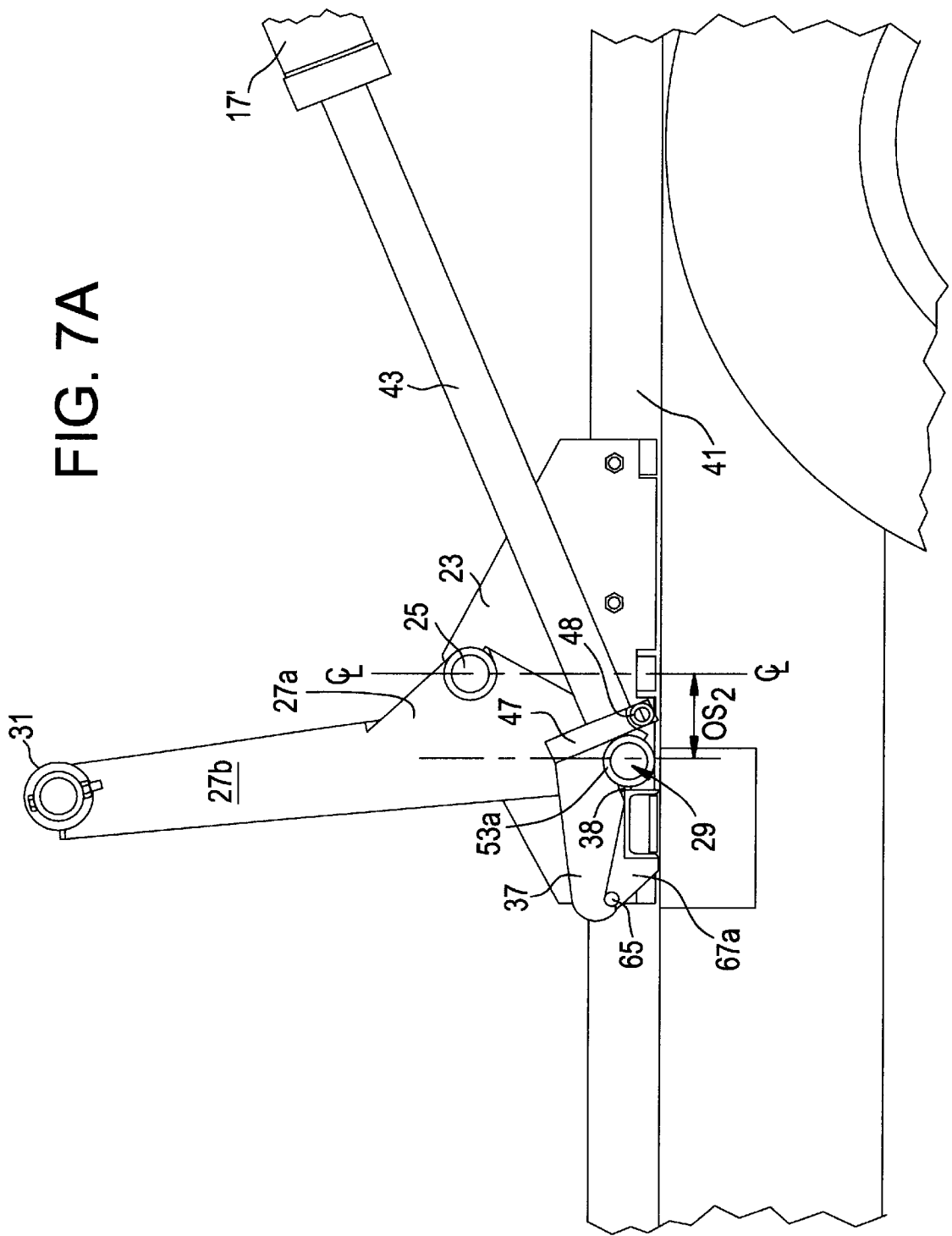
FIG. 7A is a side plan, quasi-schematic, partial view of the embodiment of FIGS. 4A–C, in the fully raised and latched mode.
Figure 7B:
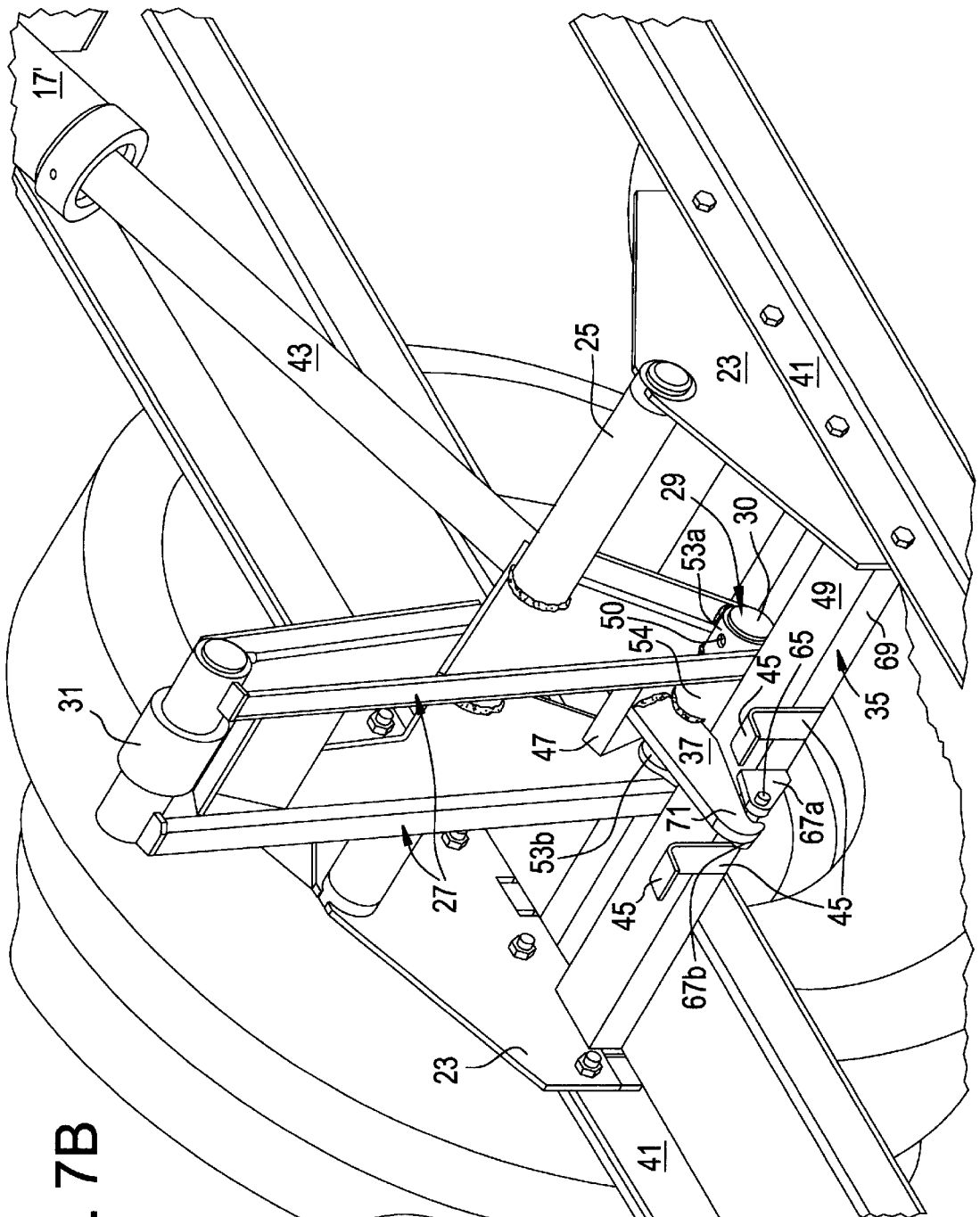
FIG. 7B is a rearward looking partial perspective view of the hoist in the mode as illustrated in FIG. 7A.

FIGS. 4A, 5A, 6A and 7A sequentially illustrate one technique for connecting hook 37 operatively into the system. As described more fully below, pivot 29 is comprised of a central shaft 30 and a pair of short tubular bushings 53a, b (see FIGS. 4C and 7B) spaced apart to allow tubular bushing 54 (FIG. 7B) to fit between them. Shaft 30 of pivot 29 is inserted through the three concentric bushings (53a, 54, 53b) and is pinned (at 50) to one of the bushings 53a or 53b to lock it in place, thereby to allow bushing 54 to rotate on shaft 30 between bushings 53a and 53b. As shown in FIG. 7B, bushings 53a, b are welded to their respective arms 27 (certain representative welds being represented by "xxxxxxx" in FIG. 7B). Bushing 54, in this respect, is actually the conventional crosshead of cylinder 17', and thus is part of a rigid, welded assembly comprised of tubular cylinder rod 43, plate 47, bushing 54, and hook 37.

With particular reference to FIG. 7B, hook 37 is welded at its butt end very securely, to the upper portion of plate 47 (shown at "xxxxx" in FIG. 7B), and is shaped to fit atop tubular crosshead bushing 54, to which it is also welded (shown at "xxxx" in FIG. 7B). Hook 37 is thus rigidly attached to cylinder 17 and will rotate with cylinder 17' about shaft 30 at pivot 29. This double connection of the hook to two members (47, 54) assures that hook latching member 37, when latched, will have sufficient strength to either eliminate or minimize rebound during any attempt to conduct the detrimental operator maneuver discussed above when attempting to jar undumped wet dirt, etc. from the bed after it is raised.

Figure 5C:
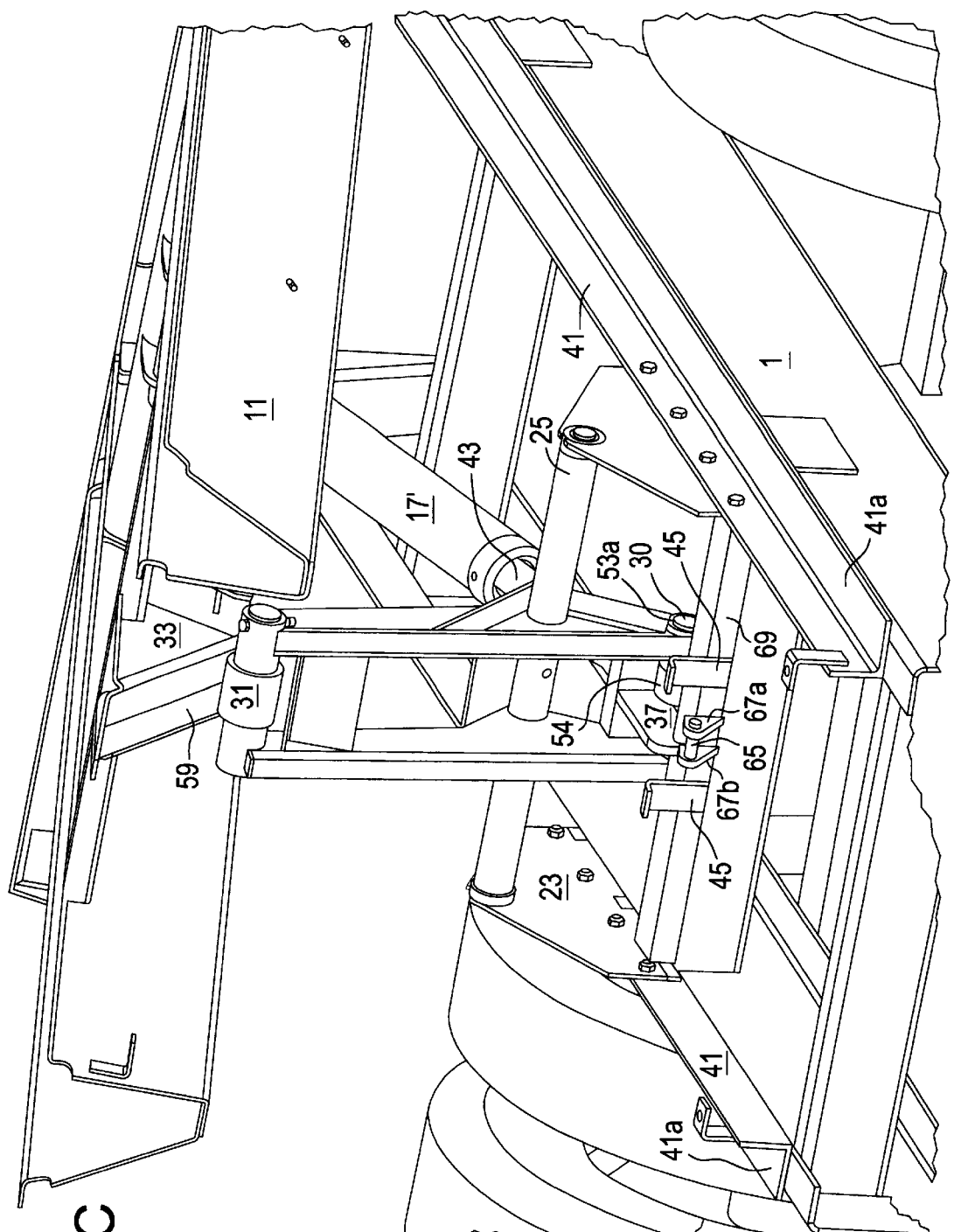
FIG. 5C is a rearward looking partial perspective view of the hoist and mode as illustrated in FIG. 5B.

FIGS. 5A–C illustrate the truck and hoist with extension rod 43 extended just to the point at which bushings 53a–b of arm assemblies 27 (in this embodiment, actually tips 38 are the contact point, as described below) have contacted stop mechanism 35. As can be seen at this point in the raising of the dump bed, first pivot 29 has rotated to its final offset $OS_2$ from centerline CL of second pivot 25, and elongated booster arm 27' has extended to approximately its maximum height. At this point, furthermore, slider or roller mechanism 31 has progressed to almost the end of track surface 59 of track 33. Surface 59 has been angled, in this respect, so as to provide ease of motion (lifting or raising) as well as to add further lifting height to bed 11 due to the length of rear surface 61 thereof. As illustrated, track 33 has been conveniently connected to the understructure of dump bed 7 both longitudinally and laterally by way of bed cross support member 64. The angle chosen for slide surface 59 is dependent on the given the location of the hoist and size of the truck and bed involved, and is chosen to achieve the most efficient lift operation as dictated by the parameters of a particular hoist and truck system.

With reference to the position of the hoist shown in FIG. 5A, pivot 29 has been brought to its stop position with respect to stop 35. This is accomplished in certain preferred embodiments of this invention by a technique used to protect the crosshead 54 during the stopping process by preventing it from contacting stop 35. This is accomplished by having the lower tip ends 38 of arms 27' extend about their respective bushings 53a, b (to which they are welded), a sufficient distance such that their tip ends 38 serve as the contact point with rear surface 55, and not crosshead 54 which, having the same diameter as 53a, b is thereby inset from the contact surface of tip ends 38. When such protective contact is then made, arms 27 cannot rotate further, but no contact is made with crosshead 54 either initially or on any attempted rebound. Further extension of rod 43 of cylinder 17 will then cause bed 7 to raise and "break away" from roller 31 (as shown in FIG. 6A). As illustrated in FIG. 6A, cylinder 17' has extended from the position shown in FIG. 5A, and has also increased its angle of elevation relative to truck frame 1. This is because the end of cylinder 17 connected at 21 has moved higher as bed 7 was raised. This rotation of cylinder 17' about pivot 29 also has caused hook 37, rigidly connected to bushing 54, to lower part way over latch pin 65 into a partially latched position. Further extension of cylinder 17 continues this process. Finally, as shown in FIGS. 7A, B, when bed 7 reaches a point at final dump height, hook tip 71 will be rotated into full retaining engagement with pin 65 and the ability to "pop" the clutch and separate the various parts of the hoist will be effectively eliminated at this height.

Given the above disclosure, the skilled artisan will recognize that leeway in the tightness of the latching of hook tip 71 to latch pin 65 may be allowed and still accomplish the purposes of this invention. For example, if hook 37 is partially latched when the truck bed dump angle reaches approximately 35 degrees, i.e. the angle at which the load would just begin to unload under normal circumstances, the latch mechanism offers considerable protection even at this low dump angle. While the clutch popping maneuver is always undesirable, experience indicates that in many instances the operator normally wishes to extend the lift operation to maximum height of at least 50 degrees before the maneuver is attempted. At this height the maneuver is ineffective because rebound is prevented (in the preferred embodiments) where the latched hook and stop connection prevent any significant separation and rebound during the aforesaid maneuver. At the lesser height, moreover, the maneuver is less effective because of the hook's limiting position, and thus the system discourages the maneuver at lesser heights even if it does not prevent it altogether.

If desired, of course, hook 37 may be designed to latch fully at some point below full height. In this less desirable situation, further rotation of cylinder 17' and hook 37 as the bed extends toward maximum height, will, with the undersurface of the hook properly shaped, simply push tip 71 past pin 65 as hook 37 slides along its, perhaps differently shaped, angle portion 73 on pin 65. Any harm from the use of the aforesaid maneuver in this configuration, while not totally eliminated, will be minimized because on rebound, hook tip 71 will reengage pin 65, substantially minimizing the rebound, and thus the harm, depending on how much rebound hook 37, via its length, position, etc. will allow to occur.

Figure 8:
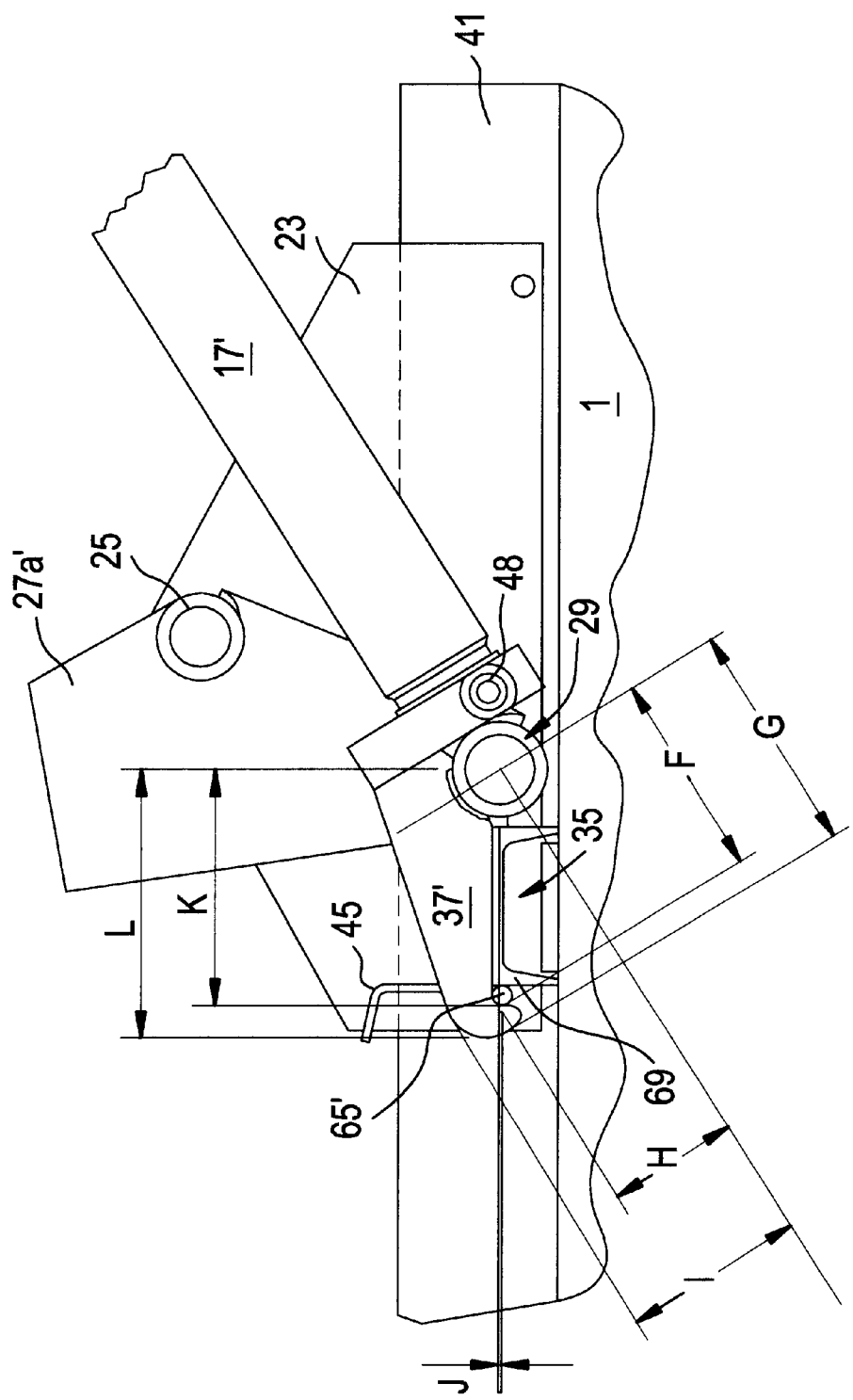
FIG. 8 is a side plan view illustrating an embodiment of a latching mechanism according to this invention, for the purpose of demonstrating various exemplar dimensions.

In this respect, attention is now directed to FIG. 8 wherein another embodiment of the latch mechanism of this invention is illustrated for a 10 foot dump bed with a telescopic cylinder rather than an 8 foot dump bed and a single stage cylinder as assumed and illustrated in FIGS. 4–7. In this embodiment like parts to those previously illustrated are given the same number. In this embodiment the latch retaining mechanism employed has been slightly modified. Here, flanges 67a–b are eliminated, and, instead, pin 65' is welded directly to forward surface 69 of stop mechanism 35. In addition, hook 37' is shaped differently along its lower surface from hook 37 as is evident from a comparison of FIG. 8 with FIG. 4A) so as to eliminate the obtuse angle as shown in FIG. 4A. Other than these differences the mechanism is virtually the same and operates in the same manner as described above.

Here, hook 37', for example, is shown in full latching engagement with pin 65'. By way of example rather than limitation, the following dimensions may be employed in such a configuration and with reference to the type hoist and construction (and 10 foot dump bed) illustrated in FIG. 8:

| Item | Dimension (inches) | Description |
|---|---|---|
| F | 5.09 | Centerline of 29 to outside radius 65' |
| G | 5.76 | Centerline 29, forward radius of hook 37' |
| H | 3.24 | Centerline 29, 17', upper radius 37' |
| I | 4.44 | Centerline 29, 17' upper hook 37' |
| J | 0.08 | Centerline 29 to centerline pin 65' |
| K | 6.00 | Width of tip of hook |

-continued

| Item | Dimension (inches) | Description |
|---|---|---|
| L | 6.87 | Length of hook to vertical centerline of pivot 29 |

As stated above, it is understood that these dimensions will change somewhat, accordingly, when, as, for example, and as shown in FIGS. 4–7, an 8 foot dump bed (using a single stage cylinder) is employed. Such dimensions will again vary as other dump bed sizes and cylinders are used. All are considered to be a part of, and within the scope of, this invention.

Figure 9:
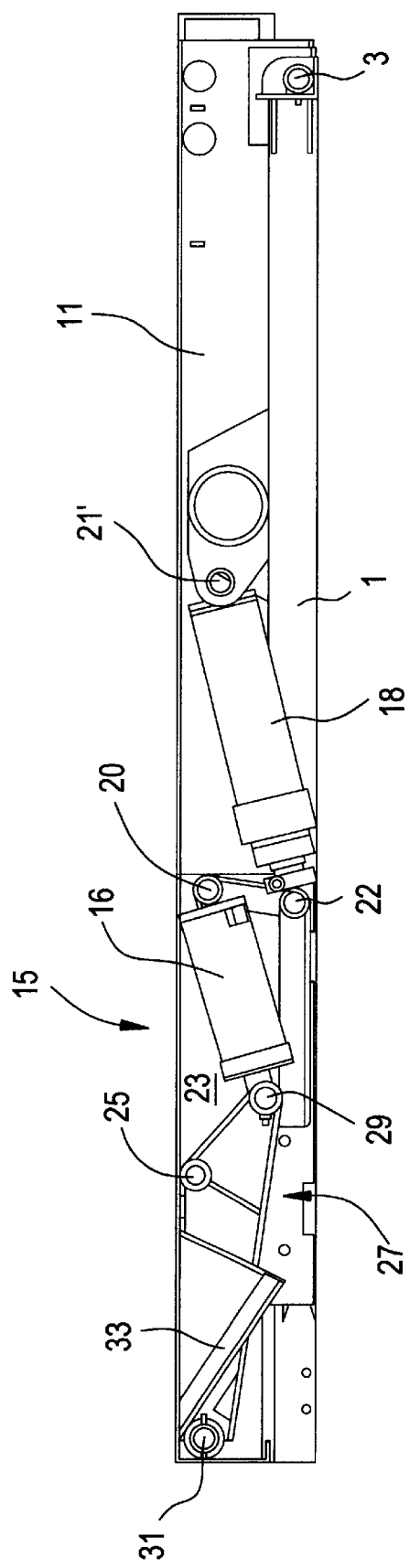
FIG. 9 is a side view of another embodiment of the hoist according to this invention.
Figure 10:
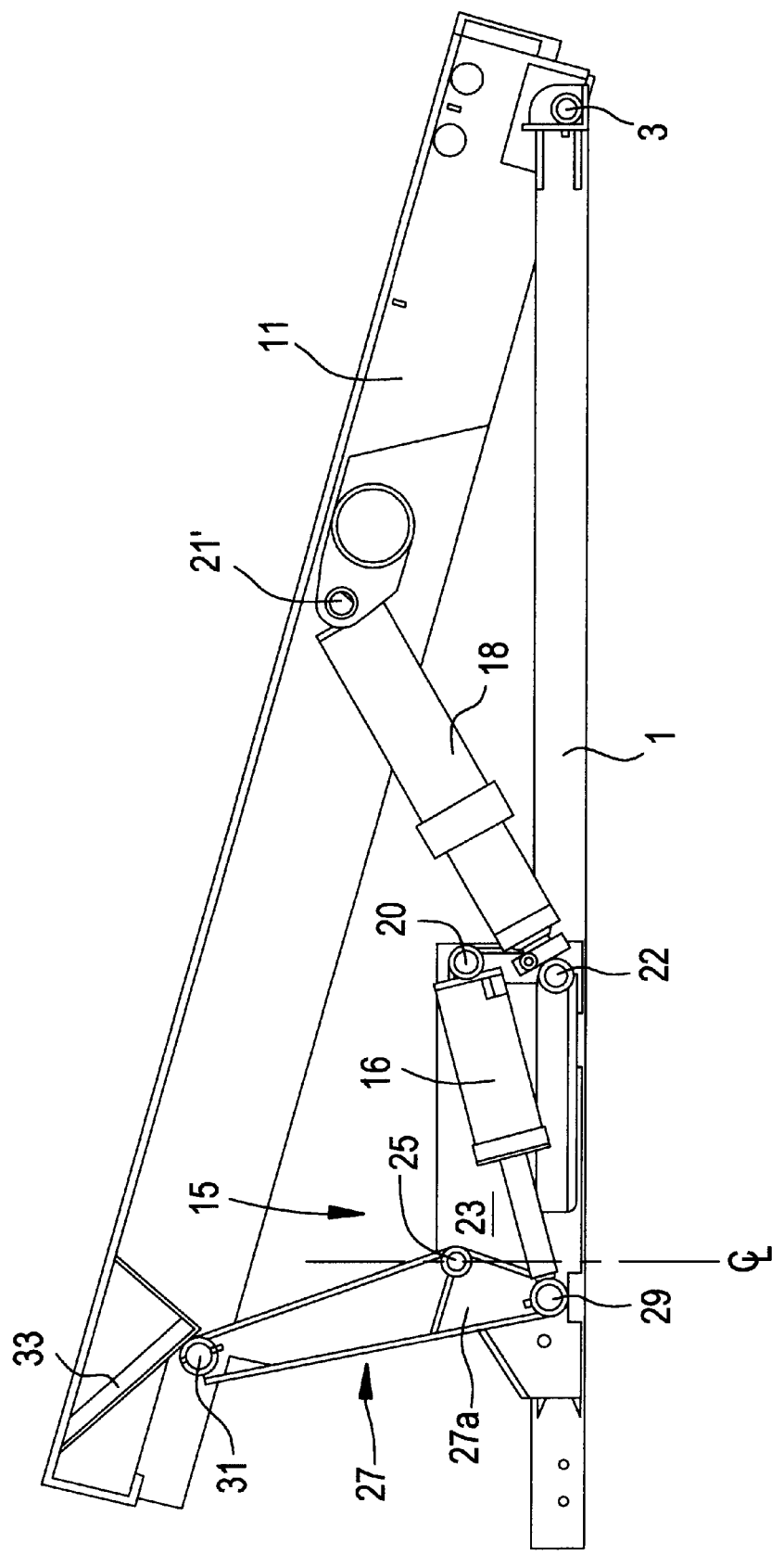
FIG. 10 is a side plan view of the embodiment of FIG. 9 illustrating the position of the hoist as being near the end of the first lift phase.
Figure 11:
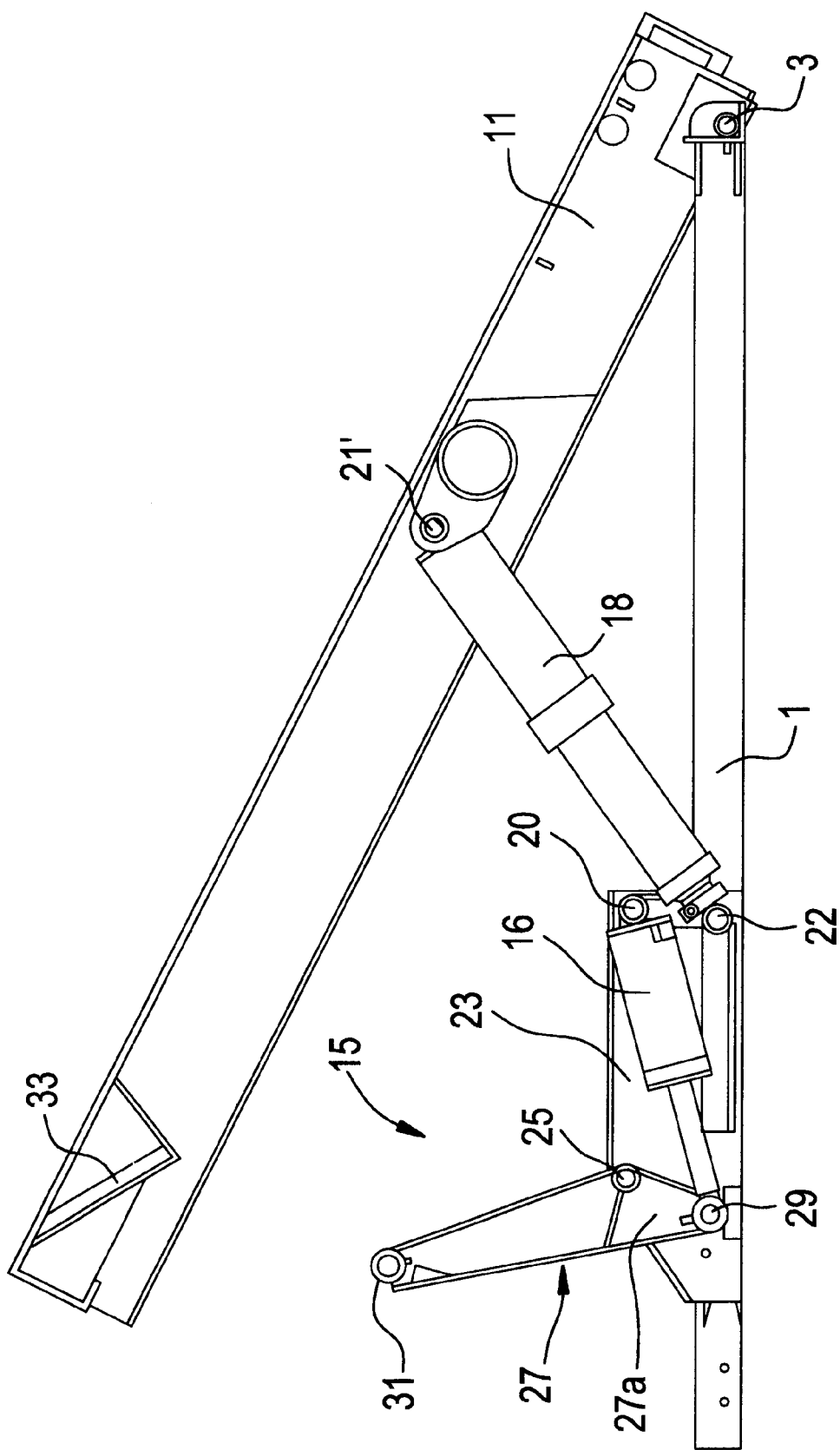
FIG. 11 is a partial side view of the embodiment of FIG. 9 showing the hoist during the second lift phase.

Referring now to FIGS. 9–11, there is illustrated an alternative embodiment of the subject invention which again achieves the above-described lifting efficiencies of this invention while continuing to utilize lever arms 27 but doing so without requiring that hook 37 be employed to protect the hoist 15 from the aforesaid load jarring maneuvers. In particular, rather than employing a single cylinder 17 (or 17'), the hoist illustrated in FIGS. 9–11 employs two cylinders 16 and 18. By utilizing these two cylinders in the configuration of the hoist of the present invention, the desired lifting efficiencies are achieved as well as the durability of the hoists themselves (particularly when subject to the specific aforementioned maneuvers) without the complexity of, or the manufacturing and maintenance costs of, the hook assembly described above.

Specifically, in order to achieve these unique and efficient results, cylinder 16 is connected at one end (at pivot 29) to arm 27 much like cylinder 17 (or 17') in previous embodiments (e.g. FIG. 3), but at its other end is pivotally connected to base members 23 via pivot 20 (rather than frame members 11). Base members 23, as in previous embodiments, are rigidly secured to frame members 1.

Next, as shown, cylinder 18 is connected to base member 23 via pivot 22 at a location below the horizontal plane of pivot 20, and at its opposite end, is attached to frame members 11 via pivot 21'. When attached in this manner, hoist 15 is in a non-raised position (and frame members 11 are parallel to frame members 1), and assumes a rather compact form (see FIG. 9) despite the utilization of multiple cylinders (16 and 18).

Although cylinders 16 and 18 are shown attached in certain configurations and locations with respect to each other, these specific configurations are shown merely to demonstrate the efficacy of one embodiment of the subject hoist. Other configurations are, of course, contemplated and it is within the skill of the artisan to determine appropriate locations and/or configurations depending on the truck and cylinder sizes or types. For example, as in other embodiments, cylinders 16 and 18 may be attached so that the larger base end of the cylinder is attached to arm 27 or pivot 22.

Turning now to FIGS. 10–11, the operation of the subject embodiment is illustrated sequentially therein. In this embodiment, when hydraulic fluid is supplied to cylinders 16 and 18 and the cylinders are caused to extend, both cylinders act synchronously to lift frame members 11 about pivot 3 and therefore the truck bed (not shown) away from frame members 1 in the initial lift stage. Specifically, as these cylinders extend, pivot 29 begins to rotate clockwise about pivot 25 and roller 31 imparts a vertical upward lifting force to track 33 (which is attached to frame members 11). Simultaneously, cylinder 18 applies an angular upward lifting force on frame members 11 at pivot 21'.

As the cylinders continue to extend upon further pressurization, pivot 29 continues to rotate about pivot 25 past centerline CL of pivot 25 (see FIG. 10), and frame members 11 (and thus the truck bed) continue to raise until the cylinder 16 reaches its full stroke (i.e. is fully extended). Once cylinder 16 is fully extended and rotation of arm 27 has ceased, further pressurization of cylinder 18 alone causes track 33 to break away from roller 31. At this "break away" point, frame members 11 are oriented at an angle of approximately 13–17 degrees (with respect to frame members 1), and it is this "break away" (from track 33) which marks the end of the first lifting stage.

Thereafter, and now beginning the second lift stage, cylinder 18 is again further pressurized, and frame members 11 continue to raise until a full lift angle of approximately 50 degrees (from horizontal) is achieved.

In this fully raised position, the dumping or emptying of a load being carried by a truck bed will normally occur due, in combination, to the normal forces of gravity and the lift angle which has been achieved. If, however, the load does not fully empty and the operator of the vehicle carrying the truck bed attempts the aforedescribed load jarring maneuver, damage or stress to hoist 15 is effectively minimized by the direct, rigid connection of cylinder 18 between base member 23 and frame members 11. Located and pressurized as described herein, cylinder 18 acts as a stabilizing and shock absorbing brace during these often violent, stress imparting maneuvers and may be used as a replacement for the above-described hook mechanism or in combination with it for added security.

Although FIGS. 9–11 illustrate an embodiment which employs two cylinders (e.g. 16 and 18), other embodiments are contemplated in which three or more cylinders are utilized. One such embodiment employing three cylinders is illustrated in FIGS. 12–13.

Figure 12:
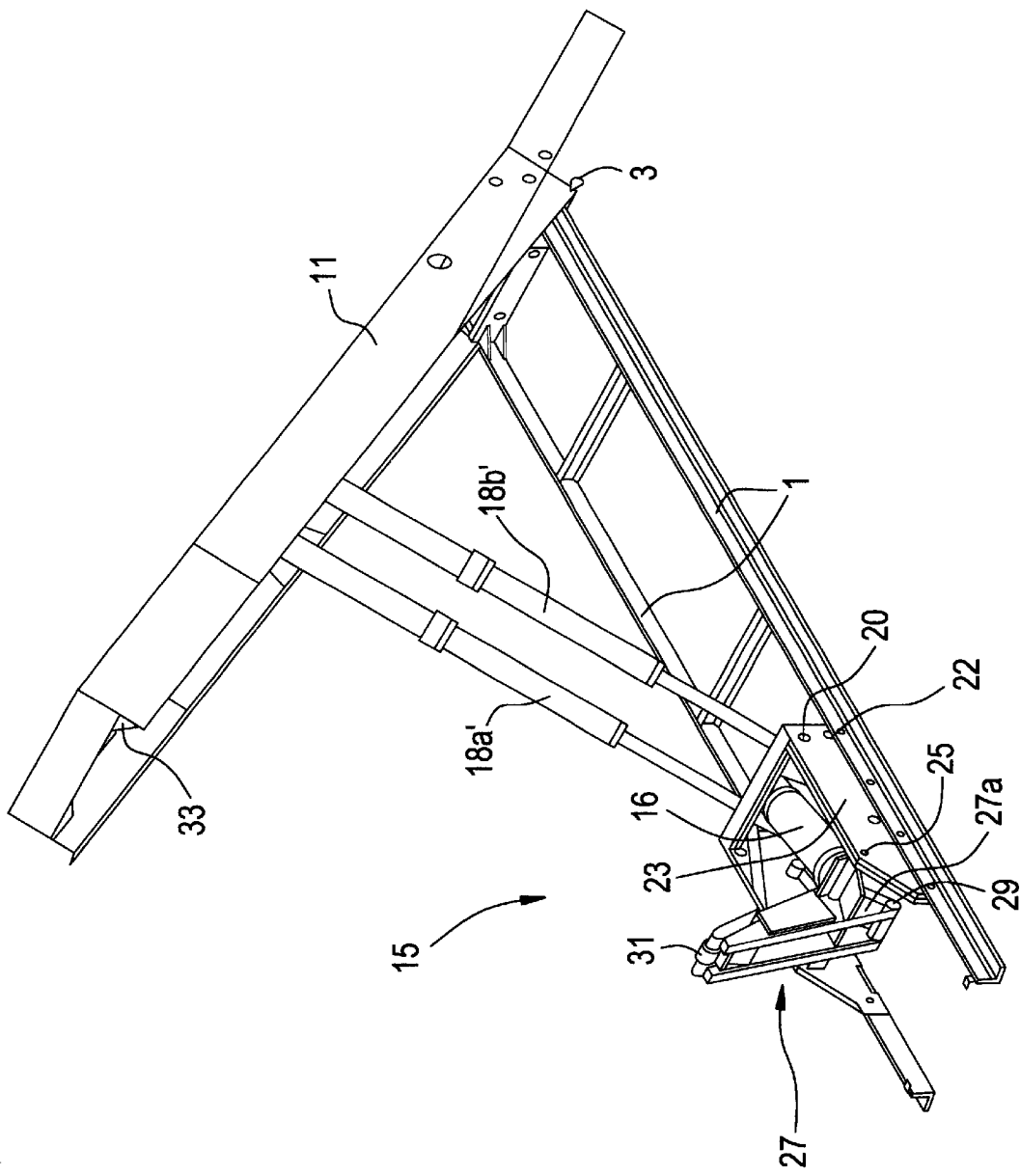
FIG. 12 is a rearward looking partial perspective view of another embodiment of a hoist according to this invention, the hoist being shown in its elevated position.
Figure 13:
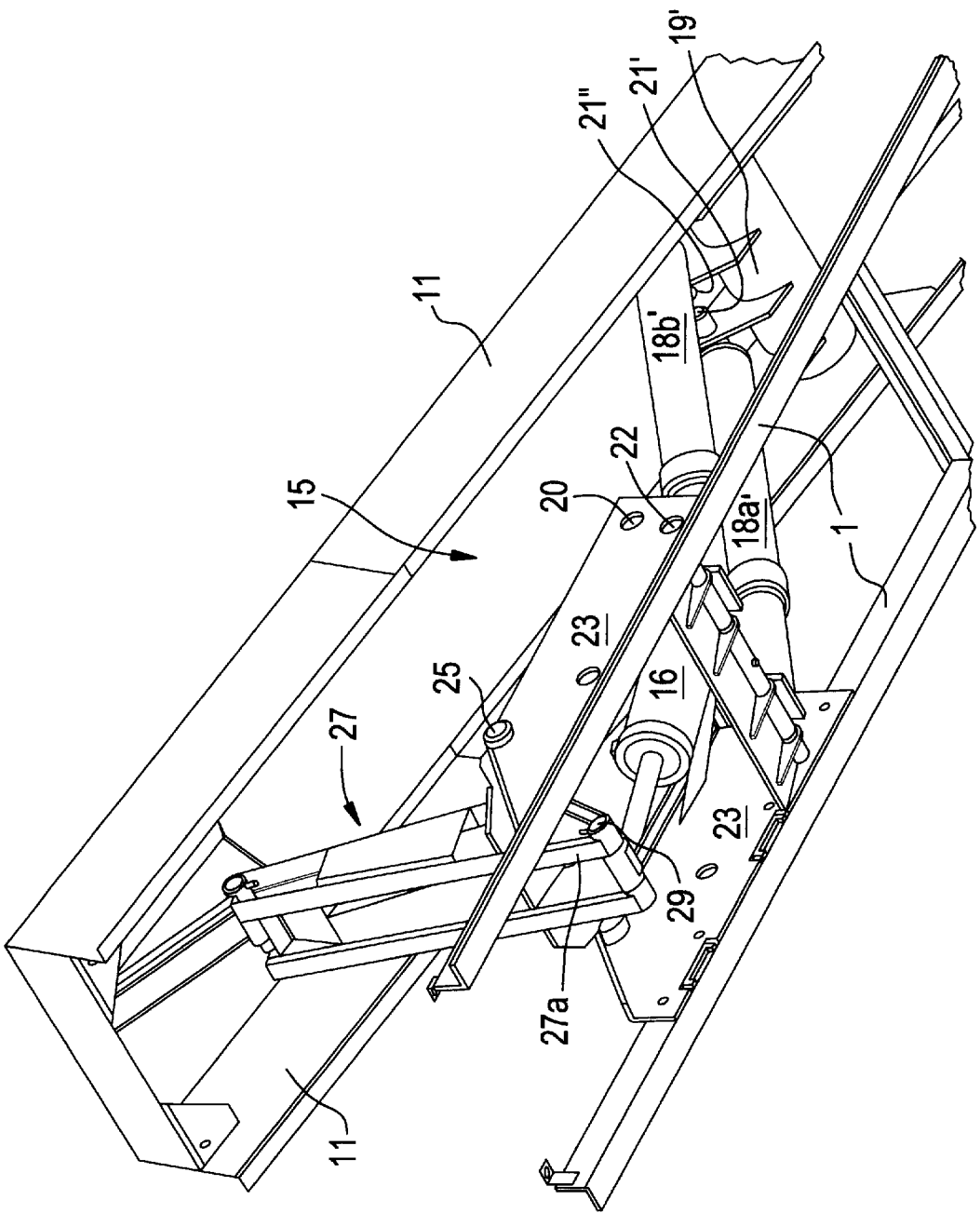
FIG. 13 is a rearward looking partial perspective underside view of the embodiment illustrated in FIG. 12.

As may be seen in FIGS. 12–13, a single cylinder 16 is connected as similarly described in the embodiment of FIGS. 9–11. Specifically, cylinder 16 is located between base members 23 and lever arms 27. Next, instead of employing a single cylinder 18 (as in FIGS. 9–11), a pair of cylinders 18a' and 18b' are utilized and are configured parallel to each other so that each extends from one of base members 23 to one pivot 21' or 21" (attached to bracket 19'). Pivots 21' and 21" are located in bracket 19', as shown, which extends between frame members 11. In this configuration, this embodiment performs nearly identically to the embodiment illustrated in FIGS. 9–11 with the exception that the combination of the two cylinders 18a' and 18b' provides a greater lifting ability which is useful when hoist 15 is employed on larger trucks such as those of 14 feet and longer. Embodiments employing additional cylinders are, of course, contemplated for use on larger trucks or when unusually heavy loads are anticipated.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A hoist for raising and lowering a truck bed to and from a truck frame, said hoist comprising:
    a first extendible and retractable cylinder having a first end and a second end;
    means for attaching said first end of said first cylinder to a truck frame;
    a second extendible and retractable cylinder having a first end and a second end;

means for attaching said first end of said second cylinder proximal a truck frame, and means for attaching said second end of said second cylinder to a truck bed;

a lever mechanism comprising a base member attachable to a truck frame, an elongated arm having a first end and a second end, a first pivot connecting said second end of said first cylinder to said first end of said elongated arm, a second pivot connecting said base member to said elongated arm at a location intermediate said first and second ends of said elongated arm, means located proximal said second end of said elongated arm for contacting a member of the truck bed;

wherein extension of said first and second cylinders, when said hoist is installed on a truck, elevates the truck bed to a first elevated position; and wherein when said first cylinder extends to a predetermined length, extension of said second cylinder thereafter disengages said means proximal said second end of said elongated arm from said member of the truck bed, and elevates the truck bed to a second elevated position which is a greater elevation than said first elevated position.

2. A hoist according to claim 1 wherein said first extendible and retractable cylinder is a hydraulically operated cylinder comprised of a first cylindrical base member and a second cylindrical member extendable under hydraulic pressure therefrom, wherein said first cylindrical base member has a larger diameter than said second cylindrical member and wherein said first cylindrical base member is pivotally attachable to a truck frame, and said second cylindrical member is pivotally attached to said first pivot.

3. A hoist according to claim 1 wherein said second extendible and retractable cylinder is a hydraulically operated cylinder comprised of a first cylindrical base member and a second cylindrical member extendable under hydraulic pressure therefrom, wherein said first cylindrical base member has a larger diameter than said second cylindrical member and wherein said first cylindrical base member is pivotally attachable to a truck bed, and said second cylindrical member is pivotally attached to a truck frame.

4. A hoist according to claim 1 wherein said base member comprises a pair of parallel opposing base plates each connected to a respective frame member of a vehicle; and wherein said first and second pivots include a shaft member having first and second ends, each of said first and second ends of said shaft member being connected to a respective base plate.

5. A hoist according to claim 4 wherein said predetermined length is substantially equal to the distance of a full stroke of said first cylinder.

6. A hoist according to claim 5 wherein when said first cylinder extends to said predetermined length, said first pivot ceases rotation about said second pivot.

7. A hoist according to claim 1 wherein said hoist further includes a track member attachable to a truck bed and locatable between the truck bed and said second end of said elongated arm and further locatable for contact with said means located proximal said second end of said elongated arm to thereby provide a path for movement of said means located proximal said second end of said elongated arm therealong during the initial lifting of the truck bed.

8. A hoist according to claim 7 wherein said track member includes a surface along which said means located proximal said second end of said elongated arm moves, said track member forming an acute angle with respect to said truck bed.

9. A hoist according to claim 1 wherein said first pivot and said second pivot each have a vertical plane defined by its respective vertical centerline and wherein when said first cylinder is fully retracted said vertical plane of said first pivot is located at a first offset distance from one side of said vertical plane of said second pivot, and wherein when said first cylinder is caused to extend to said predetermined length, said vertical plane of said first pivot is located at a second offset distance from the opposite side of said vertical plane of said second pivot.

10. A hoist for raising and lowering a truck bed to and from a truck frame, said hoist comprising:

a first extendible and retractable cylinder having a first end and a second end;

means for attaching said first end of said first cylinder to a truck frame;

a second extendible and retractable cylinder having a first end and a second end;

a third extendible and retractable cylinder having a first end and a second end;

means for attaching said first end of said second cylinder proximal a truck frame, and means for attaching said second end of said second cylinder to a truck bed;

means for attaching said first end of said third cylinder proximal a truck frame, and means for attaching said second end of said third cylinder to a truck bed;

a lever mechanism comprising a base member attachable to a truck frame, an elongated arm having a first end and a second end, a first pivot connecting said second end of said first cylinder to said first end of said elongated arm, a second pivot connecting said base member to said elongated arm at a location intermediate said first and second ends of said elongated arm, means located proximal said second end of said elongated arm for contacting a member of the truck bed;

wherein extension of said first, second, and third cylinders, when said hoist is installed on a truck, elevates the truck bed to a first elevated position; and wherein when said first cylinder extends to a predetermined length, extension of said second and third cylinders thereafter disengages said means proximal said second end of said elongated arm from said member of the truck bed, and elevates the truck bed to a second elevated position which is a greater elevation than said first elevated position.

11. The hoist according to claim 10 wherein said second and said third cylinders are oriented parallel one to the other.

12. The hoist according to claim 10 wherein said base member comprises a pair of parallel opposing base plates each connectable to a respective frame member of a vehicle; and wherein said first and second pivots include a shaft member having first and second ends, each of said first and second ends of said shaft member being connected to a respective base plate.

13. The hoist according to claim 12 wherein said first ends of said second and third cylinders are each pivotally attached to a pivot means which extends between said pair of parallel opposing base plates.

14. The hoist according to claim 12 wherein said predetermined length is substantially equal to the distance of a full stroke of said first cylinder.

15. The hoist according to claim 14 wherein when said first cylinder extends to said predetermined length said first pivot ceases rotation about said second pivot.

16. A hoist according to claim 10 wherein said hoist further includes a track member attachable to a truck bed and locatable between the truck bed and said second end of said elongated arm and further locatable for contact with said means located proximal said second end of said elongated arm to thereby provide a path for movement of said means located proximal said second end of said elongated arm therealong during the initial lifting of the truck bed.

17. A hoist according to claim 16 wherein said track member includes a surface along which said means located proximal said second end of said elongated arm moves, said track member forming an acute angle with respect to the truck bed.

18. A hoist according to claim 10 wherein said first pivot and said second pivot each have a vertical plane defined by its respective vertical centerline and wherein when said first cylinder is fully retracted said vertical plane of said first pivot is located at a first offset distance from one side of said vertical plane of said second pivot, and wherein when said first cylinder is caused to extend to said predetermined length, said vertical plane of said first pivot is located at a second offset distance from the opposite side of said vertical plane of said second pivot.

* * * * *